(12) United States Patent
Poulsen

(10) Patent No.: US 11,047,689 B1
(45) Date of Patent: Jun. 29, 2021

(54) ORIENTATION AND NAVIGATION APPARATUS

(71) Applicant: Peter D. Poulsen, Grants Pass, OR (US)

(72) Inventor: Peter D. Poulsen, Grants Pass, OR (US)

(*) Notice: Subject to any disclaimer, the term of this patent is extended or adjusted under 35 U.S.C. 154(b) by 0 days.

(21) Appl. No.: 17/022,053

(22) Filed: Sep. 15, 2020

Related U.S. Application Data

(60) Provisional application No. 62/989,683, filed on Mar. 14, 2020.

(51) Int. Cl.
| | | |
|---|---|---|
| *G01C 21/02* | (2006.01) | |
| *G02B 23/16* | (2006.01) | |
| *G01C 21/16* | (2006.01) | |
| *G01C 5/00* | (2006.01) | |

(52) U.S. Cl.
CPC .............. *G01C 21/02* (2013.01); *G01C 5/00* (2013.01); *G01C 21/16* (2013.01); *G02B 23/16* (2013.01)

(58) Field of Classification Search
CPC .......... G01C 21/02; G01C 5/00; G01C 21/16; G02B 23/16
See application file for complete search history.

(56) References Cited

U.S. PATENT DOCUMENTS

| | | | | |
|---|---|---|---|---|
| 4,088,018 A * | 5/1978 | Anderson | ................ | B64G 1/66 244/118.1 |
| 4,470,151 A * | 9/1984 | Billingsley | ............ | G06T 5/006 250/342 |
| 4,682,091 A * | 7/1987 | Krewalk | ................ | G02B 23/16 318/603 |
| 5,093,563 A * | 3/1992 | Small | ..................... | G02B 27/58 250/201.9 |
| 5,108,168 A * | 4/1992 | Norbert. Massie A. | ..................... | G02B 7/183 359/350 |
| 5,485,306 A * | 1/1996 | Kiunke | ................. | G02B 23/08 359/399 |
| 6,133,997 A * | 10/2000 | Yamawaki | ........... | B64G 1/1021 250/203.3 |
| 6,369,942 B1 * | 4/2002 | Hedrick | ................. | G02B 23/16 342/357.34 |
| 7,105,791 B1 * | 9/2006 | Poller | ...................... | B64G 3/00 250/203.1 |
| 7,119,954 B2 * | 10/2006 | Safa | ....................... | G02B 7/183 359/399 |
| 7,769,475 B2 * | 8/2010 | Fujimoto | ................. | G01S 5/16 700/59 |
| 8,498,055 B2 * | 7/2013 | Dopilka | .............. | G02B 23/165 359/637 |
| 9,509,920 B2 * | 11/2016 | Ohta | ..................... | G03B 15/16 |

(Continued)

*Primary Examiner* — Tyler J Lee
(74) *Attorney, Agent, or Firm* — David S. Alavi

(57) ABSTRACT

Multiple telescopes of a telescope array are rigidly aligned at predetermined relative orientations to simultaneously image corresponding predesignated celestial objects. Detection of light from the celestial objects collected by the telescopes enables calculation or estimation of orientation of the telescope array with respect to the celestial sphere. That orientation, in combination with a planetary nadir direction, enables estimation or calculation of position of the telescope array relative to a planetary surface. The nadir can be measured by dropping a probe particle through an evacuated chamber onto or through a two-dimensional sensor.

27 Claims, 11 Drawing Sheets

(56) References Cited

U.S. PATENT DOCUMENTS

| | | | |
|---|---|---|---|
| 9,541,390 B2 * | 1/2017 | Maruyama | G01C 15/002 |
| 2004/0233521 A1 * | 11/2004 | McWilliams | G02B 23/00 |
| | | | 359/399 |
| 2006/0001956 A1 * | 1/2006 | Baun | G02B 23/00 |
| | | | 359/430 |
| 2006/0158722 A1 * | 7/2006 | Fujimoto | G01S 5/16 |
| | | | 359/399 |
| 2009/0027789 A1 * | 1/2009 | Watters | G02B 17/002 |
| | | | 359/865 |
| 2012/0038981 A1 * | 2/2012 | Dopilka | G02B 7/183 |
| | | | 359/419 |
| 2020/0118467 A1 * | 4/2020 | Mase | G09F 13/02 |

* cited by examiner

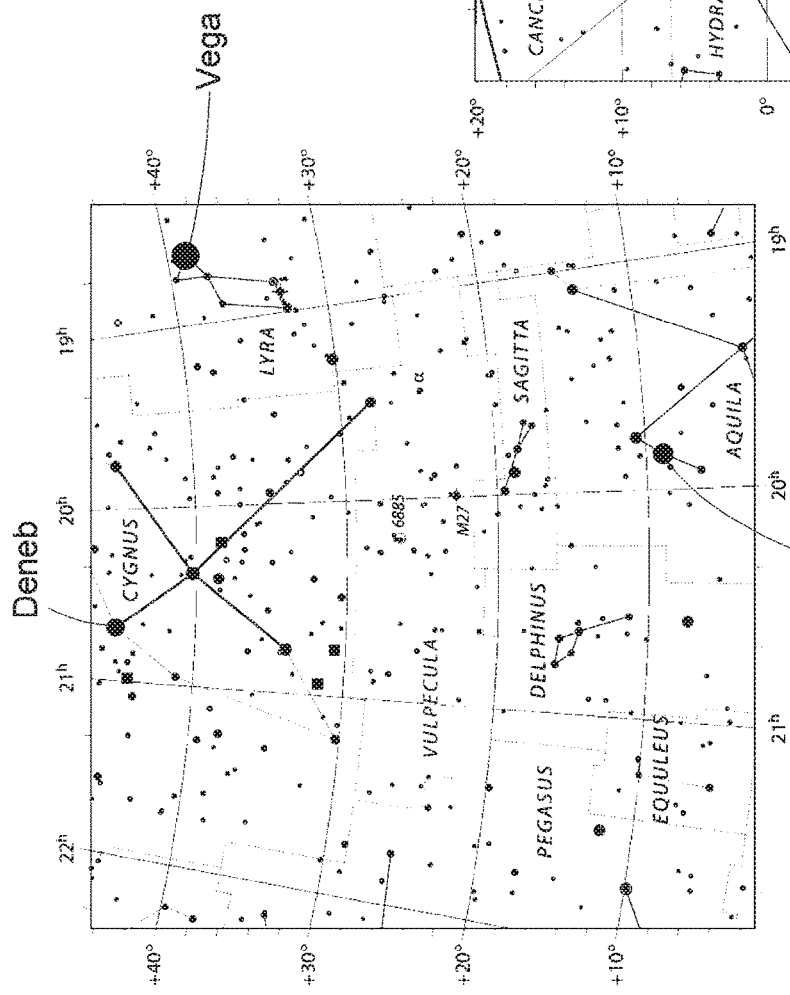

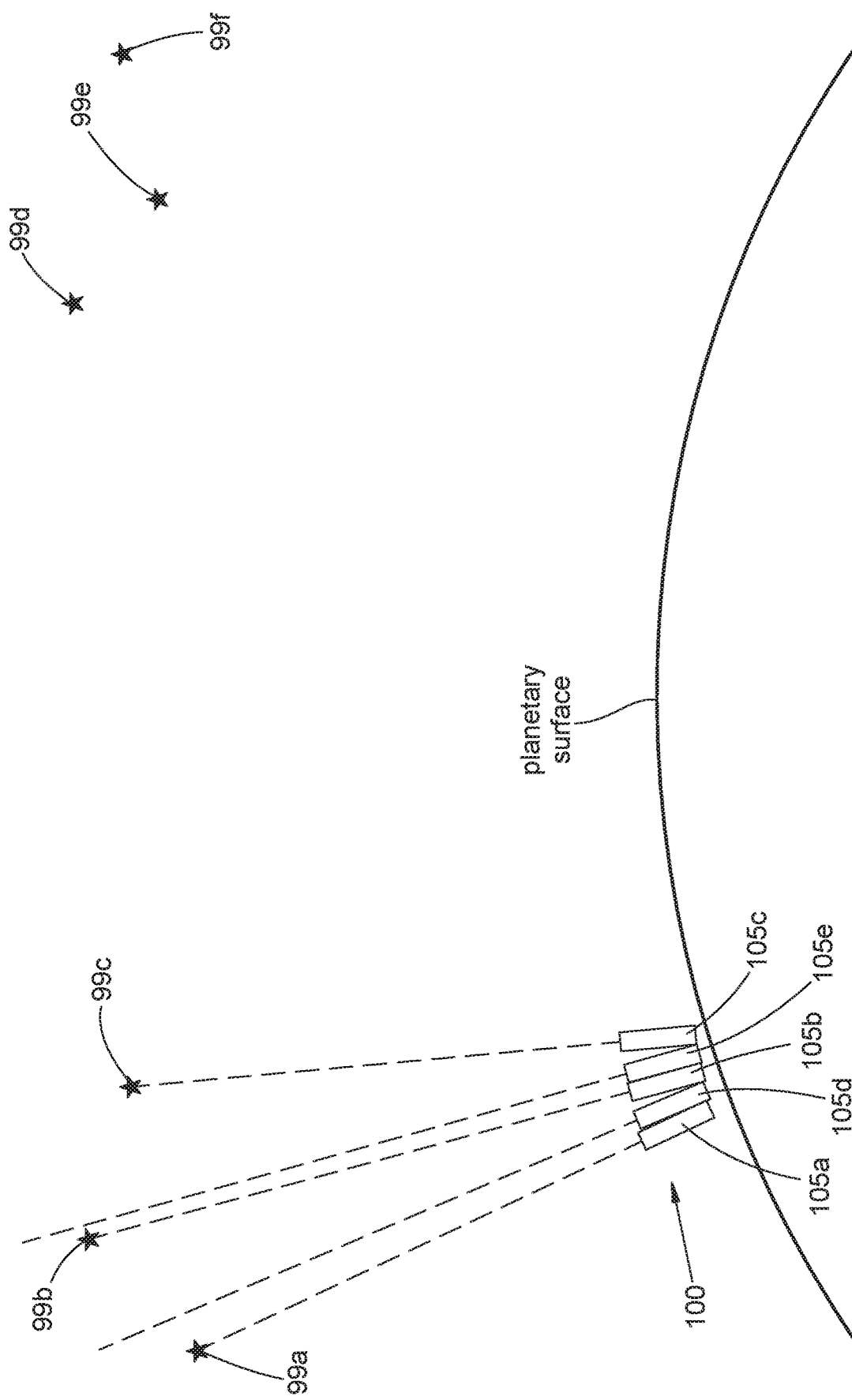

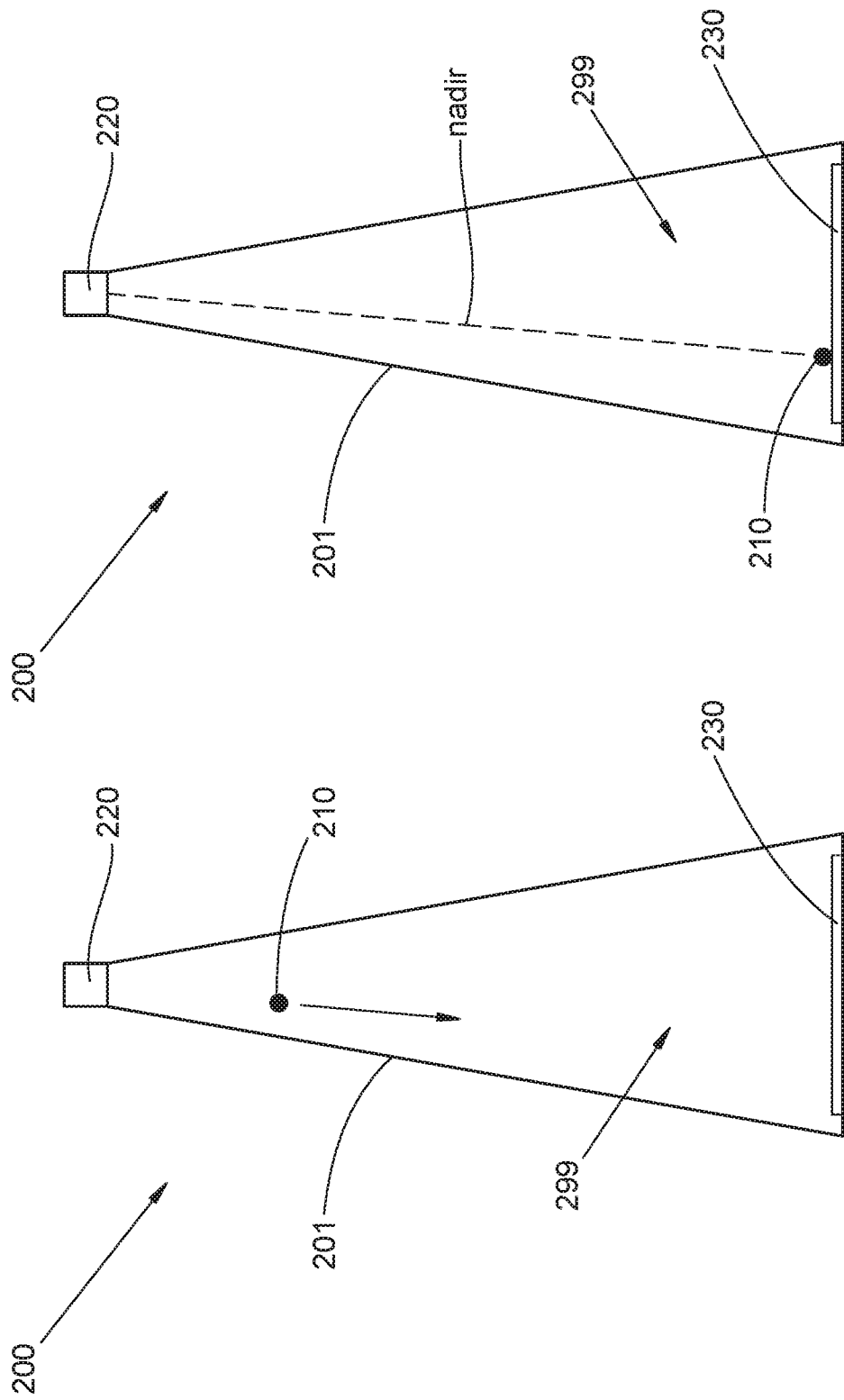

ORIENTATION AND NAVIGATION APPARATUS

CROSS-REFERENCE TO RELATED APPLICATIONS

This application claims benefit of U.S. provisional App. No. 62/989,683 entitled "Ultra-Precision Orientation and Navigation Apparatus" filed Mar. 14, 2020 in the name of Peter D. Poulsen, said provisional application being hereby incorporated by reference as if set forth herein in its entirety.

FIELD OF THE INVENTION

The field of the present invention relates to orientation and navigation, for which apparatus and methods are described herein.

SUMMARY

An inventive telescope array includes one or more sets of multiple telescopes; often one or more sets include three or more telescopes. The telescopes of each set are substantially rigidly connected together in the telescope array at a set of predetermined relative orientations with respect to one another and with respect to telescopes of all other sets. Each set of telescopes corresponds to a set of predesignated celestial objects; the telescopes within each set are oriented relative to one another so as to enable simultaneous imaging, by each telescope of that set, of a corresponding one of those predesignated celestial objects. An inventive apparatus can further include one or more of (i) a telescope positioning system providing controlled rotational movement of the telescope array, (ii) a telescope position control system that provides control signals to the telescope positioning system, (iii) a corresponding photodetector coupled to each telescope arranged to receive light directed by each telescope from the corresponding celestial object, (iv) a device for measuring orientation of the telescope array relative to a planetary nadir, (v) a computer system that can compute or estimate orientation of the telescope array relative to a celestial sphere or planetary nadir, or position of the telescope array relative to a planetary surface. Calculation or estimation of position relative to the planetary surface can be based on observation date/time, orientation of the telescope array relative to the celestial sphere, and orientation of the telescope array relative to the planetary nadir.

An inventive apparatus for measuring a planetary nadir includes (a) a body including an evacuated volume; (b) a release mechanism, (c) a probe particle, (d) a two-dimensional particle position sensor, and (e) a control and acquisition system. The release mechanism is mounted on the body at one end of the evacuated volume, and is convertible between a hold state and a release state. The probe particle is held at the first end of the chamber by the release mechanism in the hold state, and is free to move within the evacuated volume (in response to a gravitational field) with the release mechanism in the release state. The two-dimensional particle position sensor is positioned at the other end of the evacuated volume. The control and acquisition system is operatively coupled to the release mechanism and the particle position sensor. The control and acquisition system (i) switches the release mechanism from the hold state to the release state, (ii) detects a two-dimensional position relative to the particle position sensor where the moving probe particle passes through or lands on the particle position sensor, and (iii) calculates, based on the detected position, orientation of the body relative to the planetary nadir.

Objects and advantages pertaining to orientation and navigation may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 2A and 2B are maps showing angular separations among stars of the summer and winter triangles, respectively.

FIGS. 4A and 4B illustrate an inventive telescope array including two sets of telescopes aligned for two corresponding sets of stars; one telescope is shared by both sets.

FIGS. 7A and 7B illustrate schematically an inventive apparatus for measuring the nadir.

The embodiments depicted are shown only schematically; all features may not be shown in full detail or in proper proportion; for clarity certain features or structures may be exaggerated or diminished relative to others or omitted entirely; the drawings should not be regarded as being to scale unless explicitly indicated as being to scale. The embodiments shown are only examples and should not be construed as limiting the scope of the present disclosure or appended claims.

DETAILED DESCRIPTION

A variety of orientation and navigation systems exist, such as the Global Positioning System (GPS) and inertial navigation systems (INSs). GPS can provide very accurate estimates of position, and does not suffer from drift, but relies on reception of external signals from multiple GPS satellites. An INS does not rely on reception of external signals, and can be quite accurate over relatively short time intervals (e.g., several minutes or hours), but exhibits drift that causes position errors to accumulate. It would be desirable to provide an orientation and positioning system that does not rely on external signals and does not exhibit drift.

Figure 5A:
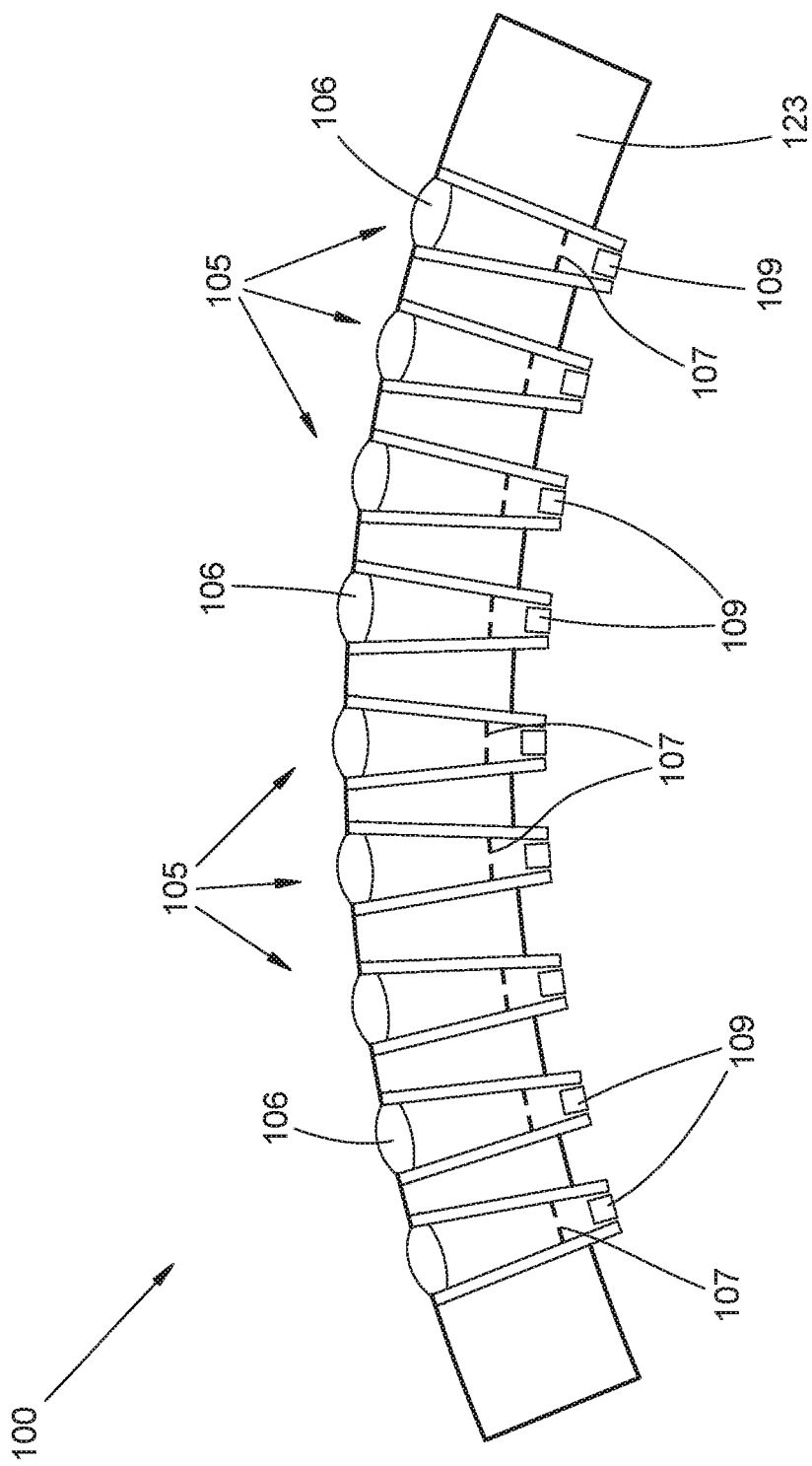
FIGS. 5A through 5C illustrate schematically construction of various inventive telescope arrays.

Accordingly, an inventive apparatus comprises a telescope array 100 that includes one or more sets of multiple telescopes 105 (e.g., as in FIGS. 5A/B/C). Note that the telescopes are referred to collectively or generically as telescope(s) 105, while a specific individual telescope may be referred to as telescope 105a, 105b, etc. The telescopes 105 of the array 100 are substantially rigidly connected together at a set of predetermined relative orientations. The corresponding telescopes 105 within each set are aligned relative to one another to enable simultaneous imaging, by each telescope 105 of that set, of a corresponding celestial object 99 of a corresponding set of multiple predesignated celestial objects. Note that the celestial objects are referred to collectively or generically as celestial object(s) 99, while a specific individual celestial object may be referred to as celestial object 99*a*, 99*b*, etc. The telescope array 100 typically is mounted on a ground vehicle, waterborne vehicle, airborne vehicle, missile, spacecraft, satellite, or other moving vehicle in order to provide orientation or position information as the vehicle moves. The telescope array 100 is mounted on the vehicle so as to have a view of celestial objects generally above the vehicle as it moves on, across, along, or above a planetary surface (all such movement shall be referred to herein as movement across the planetary surface). Stated another way, the telescopes 105 of the array 100 are mounted to have a view of at least part of the sky or outer space above the vehicle.

For purposes of the present disclosure and appended claims the following definitions apply. Terms such as up, down, vertical, horizontal, top, bottom, side, and so forth are defined with respect to a planetary surface, e.g., the sky and viewable portion of the celestial sphere are up, while the planetary surface, i.e., the ground, is down. The celestial sphere refers to an imaginary sphere against which all celestial objects 99 are viewed from on or near a given planetary body, and to the locations of those celestial objects 99 (typically defined by two angular coordinates, e.g., right ascension and declination). The celestial sphere is centered on the planetary body; locations of celestial objects on the celestial sphere can and often will differ for different planetary bodies, or even for a single planetary body during different portions of its orbit around its star (due to parallax). Planetary bodies include Earth and other planets of Earth's solar system, dwarf planets or planetoids, moons or other natural satellites, asteroids, or planetary bodies of other solar systems, e.g., exoplanets, exomoons, exosatellites, and so forth. A planetary nadir, or simply the nadir, is defined relative to a planetary body by its local gravitational field, and typically corresponds to a vertically downward direction through the planet's center of mass and the center of its celestial sphere. The direction of the nadir relative to the celestial sphere varies according to location on or near the planetary surface. The zenith is the direction opposite the nadir, i.e., vertically upward. A course or ground track across a planetary surface of a moving object is defined as the trajectory of an intersection of the nadir (relative to the moving object) and the planetary surface. In other words, ground track is the path followed on the planetary surface by the point directly below the moving object (i.e., the ground position), whether that object moves on the surface (e.g., a ground vehicle or waterborne vehicle) or above the surface (e.g., an airborne vehicle, missile, spacecraft, or satellite).

If a given set of multiple telescopes includes only two telescopes, then there are two possible orientations of those two telescopes that would enable simultaneous imaging of the two corresponding predesignated celestial objects. For such a set of two telescopes, that ambiguity can be resolved in a number of suitable ways. If one star is significantly brighter than the other, differences in light intensity through each telescope can be used to resolve the ambiguity. If additional positioning orientation data were available (e.g., date/time of observation, direction of a planetary nadir, direction of a magnetic pole, current or previous GPS or INS data, and so forth), even if only approximate, that additional data can in many examples be sufficient to resolve the ambiguity. In many examples, however, a set of telescopes includes three or more telescopes, eliminating the ambiguity (except for certain exceptional cases, e.g., if the arrangement of a particular set of celestial objects happens to exhibit rotational symmetry; if so, the ambiguity could be resolved as described above). The remainder of this disclosure describes use of sets of three celestial objects, but shall be applicable to any suitable set of any number of multiple celestial objects.

Figure 1:
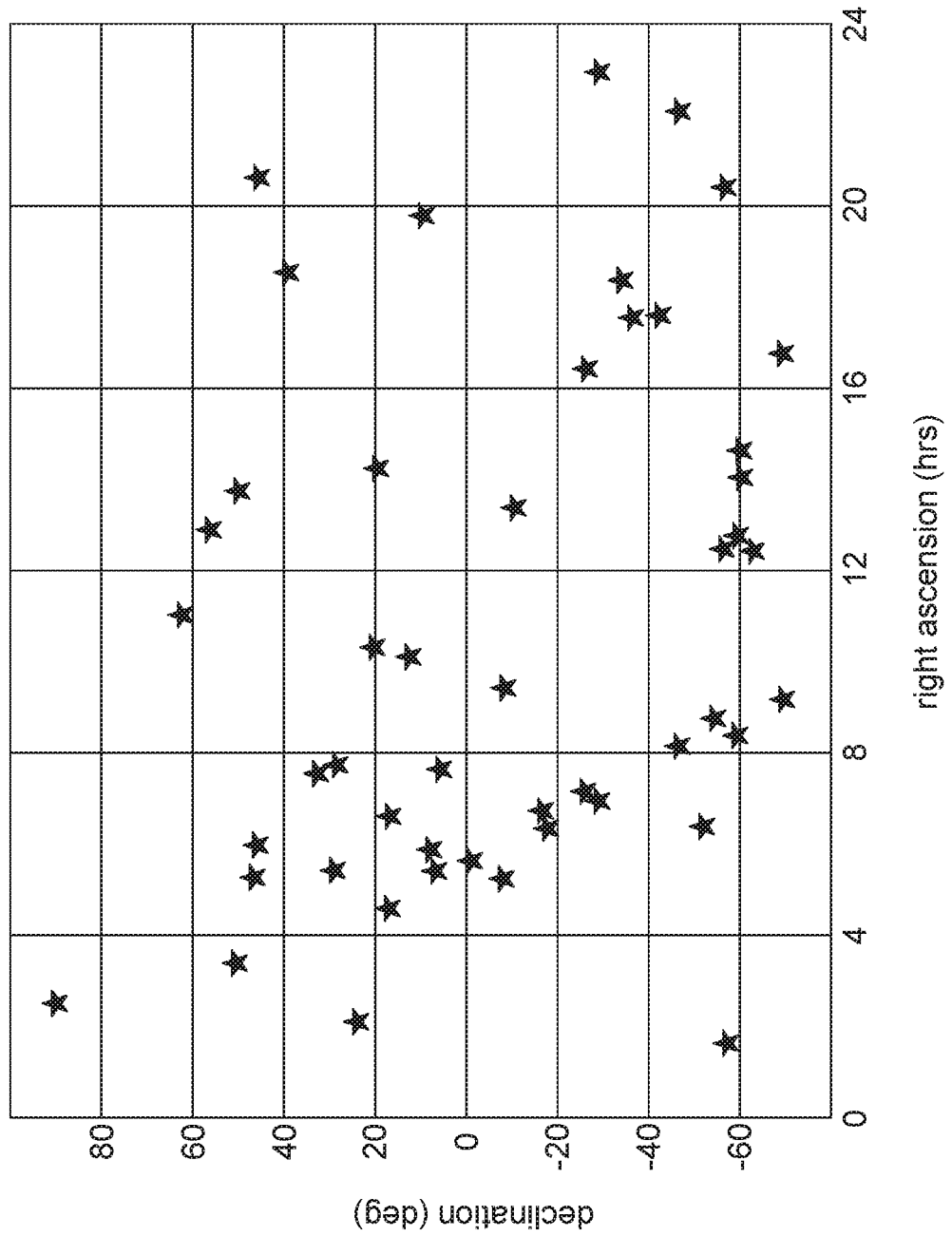
FIG. 1 is a map of the 50 brightest stars visible from Earth.

In many examples, the predesignated celestial objects 99 include stars. Although stars will be used as examples, any celestial object having a location on the celestial sphere that is known to sufficient accuracy can be employed. In some examples only stars brighter than a specified dimmest magnitude are included in a set of predesignated celestial objects 99; in some of those examples the specified dimmest magnitude is about 2.1. There are about 60 or more stars visible from Earth that are brighter than about magnitude 2.1, and typically about 5 such stars are visible in any given steradian of sky (one steradian of solid angle corresponds roughly to a cone having a full apex angle of about 66°). FIG. 1 shows angular coordinates on the celestial sphere of the 50 brightest stars visible from Earth (note that the usual units of right ascension are hours). In one example, a set of three or more predesignated celestial objects 99 can include the stars of the so-called summer triangle, Altair (magnitude 0.76), Deneb (magnitude 1.25), and Vega (magnitude 0.03), which are separated by about 38.0° (Altair-Deneb), about 23.8° (Deneb-Vega), and about 34.2° (Altair-Vega); see FIG. 2A. A corresponding set of telescopes 105 can be arranged with those same relative angles between them (i.e., 38.0°, 23.8°, and 34.2°), enabling simultaneous imaging of Altair, Deneb, and Vega through the corresponding telescopes 105 of that set. When those stars 99 are simultaneously imaged by the corresponding telescopes 105, then the orientation of the telescope array 100 relative to the celestial sphere can be unambiguously determined or estimated (to within the angular resolution of the telescopes 105 and the accuracy of their relative orientations). In another example, a set of three or more predesignated celestial objects can include the stars of the so-called winter triangle, Betelgeuse (magnitude 0.50), Procyon (magnitude 0.34), and Sirius (magnitude −1.46), which are separated by about 26.0° (Betelgeuse-Procyon), about 25.7° (Procyon-Sirius), and about 27.1° (Betelgeuse-Sirius); see FIG. 2B. A corresponding set of telescopes 105 can be arranged with those same relative angles between them (i.e., 26.0°, 25.7°, and 27.1°), enabling simultaneous imaging of Betelgeuse, Procyon, and Sirius through the corresponding telescopes 105 and unambiguous determination or estimation of the orientation of the telescope array 100 relative to the celestial sphere. Those two sets of predesignated celestial objects will be employed as examples repeatedly in the remainder of this description, however, the description applies equally to any suitable one or more sets of multiple stars or other celestial objects that can be employed using the inventive apparatus and methods.

The angular separations of stars on Earth's celestial sphere are known to greater accuracy than indicated above; some star catalogs include position data with arcsecond or sub-arcsecond accuracy. The accuracy of those angular separations, the angular resolving power of the telescopes 105, and the accuracy of the relative alignment of the telescopes 105 within each set collectively determine the accuracy of any determination or estimate of the orientation of the telescope array 100 with respect to the celestial sphere. The greater the accuracy of the orientation of the telescope array 100, the greater the accuracy of any position derived, calculated, or estimated based on that orientation. For example, accuracy on the order of an arcsecond might be needed to achieve accuracy of a ground track (discussed below) on the order of tens of feet for a vehicle trajectory at multiple tens of thousands of feet above Earth's surface. Correspondingly lower angular accuracy would be required for surface accuracy on the order of hundreds of feet, thousands of feet, or more.

Stars are sufficiently far from Earth so that movement across Earth's surface would result in no change, or only negligible changes, in relative angles measured between them. Put another way, the angular positions of stars on the celestial sphere are essentially constant with respect to different observation positions on or near Earth's surface. Consequently, determining orientation of the telescopes 105 relative to the celestial sphere is for practical purposes invariant with respect to different observation positions on or near Earth's surface. For some stars that are sufficiently close to Earth, their positions on the celestial sphere can vary slightly over the course of a year due to parallax and the size of Earth's orbit around the sun. Those variations are known and can be accurately accounted for in the determination or estimation of the orientation of the telescope array 100 relative to the celestial sphere. The discussion above also applies to different observation positions on or near any other planetary surface, from which the stars can have relative angular positions on a corresponding celestial sphere that might differ from those positions on the celestial sphere observed from Earth. Earth is referred to as an example repeatedly in the remainder of this description, but the inventive apparatus and methods described apply equally to any other planetary body.

From a given position relative to Earth's surface only a portion of the celestial sphere is visible; the remainder is obstructed by the Earth itself. At Earth's surface at most about 180° of sky is visible. With increasing altitude above Earth's surface, the angular range of visible sky increases; 100 km above Earth's surface (the so-called Karman line), about 200° of sky is visible. In some examples it can be advantageous to include in the telescope array 100 multiple sets of multiple telescopes 105, with the telescopes 105 within each set relatively aligned to image simultaneously different corresponding sets of multiple celestial bodies 99, and for those predesignated bodies 99 to be visible from different positions on or near Earth's surface. For example, the stars 99 of the summer triangle listed above are separated from the stars 99 of the winter triangle listed above by angles ranging from about 115° (Betelgeuse-Deneb) to about 166° (Procyon-Altair). All six stars of those two sets would not be visible simultaneously from most positions on or near Earth's surface; however, the range of positions wherein at least one set is visible is much larger than the corresponding position ranges for either set alone (potentially twice as large, depending on the degree of overlap).

By including in the telescope array 100 one set of telescopes 105 relatively aligned for the summer triangle and another set of telescopes 105 relatively aligned for the winter triangle, the orientation of the telescope array 100 can be determined over a wider range of positions on or near Earth's surface. Over a first range of positions on or near Earth's surface, the orientation of the telescope array 100 can be determined or estimated by detecting light from the summer triangle stars 99 using their corresponding set of telescopes 105. Similarly, over a second range of positions on or near Earth's surface, the orientation of the telescope array 100 can be determined or estimated by detecting light from the winter triangle stars 99 using their corresponding set of telescopes 105. Use of additional sets of telescopes 105 aligned to enable simultaneous imaging of other corresponding sets of celestial objects 99 can enable determination of the telescopes' orientation over additional ranges of positions on or near Earth's surface. As noted above, each steradian of sky typically has about 5 stars brighter than magnitude 2.1. In some examples one to two dozen sets of stars could be sufficient to enable estimation of the telescope array orientation over most or all of Earth's surface. In some of those examples, about 30 telescopes can be sufficient (assuming some telescopes are shared between different sets of stars). For more limited coverage of Earth's surface, in some instances as few as 5 telescopes could be sufficient to cover a selected route across Earth's surface.

In some examples (referred to herein for convenience as globular arrays) all the telescopes 105 of all sets can be relatively aligned on the array 100 according to positions of their corresponding celestial objects on the celestial sphere. In one example, six telescopes could be relatively aligned to enable simultaneous imaging of all six of the stars discussed above (if Earth or another planetary body were not obstructing some of them). The orientation of such a globular array 100 of telescopes could be maintained with respect to the celestial sphere in any suitable way (e.g., gyroscopic stabilization, servo-control, angular scanning or dithering, and so forth). As the globular array 100 of telescopes moves with respect to the planetary body, different subsets of the telescopes 105 would receive light from their corresponding stars 99, while other telescopes would not (their corresponding stars being obstructed by the planetary body). Upon movement of the globular telescope array 100 to a different position relative to the planetary body, a different subset of telescopes 105 would receive light from their corresponding stars. With such a globular arrangement, the telescope array 100 would need to rotate to any arbitrary orientation (i.e., full 360° rotation about three axes) relative to a ship, aircraft, missile, spacecraft, or other moving vehicle on which the telescope array 100 is mounted, so that the correct set of telescopes 105 would be pointing generally skyward regardless of the vehicle's position relative to Earth's surface. Put another way, the globular array 100 remains in a substantially fixed orientation (or at least within a very limited range of orientations) with respect to the celestial sphere, while the vehicle on which the array 100 is mounted can be arbitrarily oriented with respect to the celestial sphere, depending on its location on or near Earth's surface. In a globular telescope array 100, each of the telescopes 105 corresponds to a single celestial object 99.

In some other examples, each set of telescopes 105 is oriented according to its corresponding set of celestial objects 99, but the different sets of telescopes 105 need not be oriented relative to one another. In some examples including such an arrangement of the telescope array 100 (referred to herein for convenience as directed arrays), the telescopes 105 of multiple sets, or all sets, could be pointing generally skyward at the same time. In an example using the summer and winter triangle stars, a first set of telescopes 105a/b/c can be arranged according to the angular separations of the summer triangle stars; a second set of telescopes 105d/e/f can be arranged according to the angular separations of the winter triangle stars. Both of those sets of telescopes 105 can be arranged on the directed array 100 to point in the same general direction, e.g., so that with the directed telescope array 100 suitably oriented both sets of telescopes 105 would point generally skyward (as in FIGS. 3A and 3B).

With the directed telescope array 100 positioned in certain regions on or near Earth's surface (as in FIG. 3A), the telescopes 105a/b/c of the first set could be aligned with the summer triangle stars 99*a/b/c*; the telescopes 105*d/e/f* of the second set would also be directed generally skyward, but could not be aligned with the winter triangle stars 99*d/e/f* (because they would likely not be visible from that location, and because they are not suitably aligned with respect to the telescopes 105 of the first set in any case). Similarly, with the directed telescope array 100 positioned in certain other regions on or near Earth's surface (as in FIG. 3B), the telescopes 105*d/e/f* of the second set could be aligned with the stars 99*d/e/f* of the winter triangle; the telescopes 105*a/b/c* of the first set would also be directed generally skyward, but could not be aligned with the summer triangle stars 99*a/b/c* (because they would likely not be visible from that location, and because they are not suitably aligned with respect to the telescopes 105 of the second set in any case). However, the angular range over which the directed telescope array 100 must be moved (relative to the vehicle on which it is mounted) can be significantly reduced. Because multiple sets of multiple telescopes 105 of the directed array 100 can be directed generally skyward simultaneously, less rotation about the generally horizontal axes would typically be required to enable alignment of a given set of telescopes 105 with its corresponding predesignated stars 99. Full azimuthal rotation (i.e., rotation about a generally vertical axis) typically would still be needed to account for the vehicle's direction; assuming the vehicle travels with the same side generally facing the planetary surface (i.e., generally "right-side-up"), rotation about two horizontal axes can be limited to, e.g., ±5°, ±10°, ±15°, ±20°, ±30°, or other suitable limited range. Using a larger number of distinct sets of predesignated celestial objects 99 distributed more widely across the celestial sphere can enable correspondingly smaller angular ranges to be employed for rotation of the telescope array 100 about horizontal axes.

At a given date/time (i.e., at a given relative position of the planetary body along its orbit and at a given relative orientation of the rotating planetary body and the celestial sphere), each set of multiple telescopes 105 defines a corresponding area of a planetary surface from which the corresponding celestial objects 99 can be imaged simultaneously by that set. Stated differently, each set of telescopes 105 has a corresponding "field-of-view" that limits the area of sky or space within which that set of telescopes 105 can image simultaneously their corresponding celestial objects 99, which in turn defines the corresponding planetary surface areas described above. The corresponding areas (or equivalently, corresponding fields-of-view) can be limited in a variety of ways (ignoring local obstructions such as hills, mountains, vegetation, or buildings or other artificial structures). The planetary body itself blocks viewing of as much as half of the sky. Angular separation of the celestial objects 99 of the set further reduces the range of areas from which all celestial bodies 99 of that set can be seen (e.g., Altair and Deneb are separated by 38°, so that both could be seen from an area on Earth's surface spanning at most about 142°). A field of view for the telescope array 100 can be limited by a window, aperture, viewport, or mounting hardware on the vehicle on which the array 100 is mounted. A directed telescope array 100 can be limited in its angular range of movement, limiting the area of the planetary surface from which a given set of celestial objects can be simultaneously imaged, i.e., an angular range across Earth's surface from which a given set of stars 99 can be imaged by its corresponding set of telescopes 105 can be no larger than the angular range of motion of the telescope array 100 about its horizontal axes. Whatever the source of the limitation, each set of telescopes 105 can simultaneously image its corresponding set of celestial objects 99 from only a certain portion of the planetary surface at a given date/time. Because planetary bodies rotate, the planetary surface rotates relative to the celestial sphere, and the corresponding regions of the planetary surface defined by each set of telescopes 105 and the corresponding celestial bodies 99 (as described in the preceding paragraph) move across the planetary surface. Accordingly, it can be more useful to define corresponding regions of the planetary surface for each set of telescopes 105 and their corresponding celestial objects 99 over a corresponding designated time period (e.g., several minutes, one or a few hours, and so forth).

Most celestial objects are visible only during nighttime hours from Earth's surface, or from relatively low altitudes or elevations (e.g., below 100,000 feet). Accordingly, an inventive telescope array 100 typically can be used only at night (and in clear weather below about 30,000 feet or so) from locations on Earth's surface or at altitudes below about 100,000 feet. At or above the Karman line (i.e., at or above about 100,000 meters, considered to be in space), most stars are visible at any time of day (except when blocked by or too near the sun or moon). Accordingly, the inventive telescope array 100 typically can be used at any time of day at such altitudes. At intermediate altitudes (between about 100,000 feet and about 100,000 meters), some brighter stars 99 can be visible during daylight hours, in some instances enabling limited use of an inventive telescope array 100 during daylight hours.

The telescope array 100 can include sets of telescopes 105 that are aligned to corresponding sets of predesignated celestial bodies 99 that are selected based on the corresponding regions of Earth's surface from which they can be simultaneously imaged, i.e., the regions defined by the corresponding sets of telescopes 105. In some examples, the telescope array 100 can be arranged so that, during a designated time period, the corresponding areas of the planetary surface defined by one or more sets of multiple telescopes 105 collectively encompass at least a portion of a designated ground track across the planetary surface, e.g., a plane flight or a missile trajectory. More generally, the telescope array 100 can be arranged so that the corresponding areas of the planetary surface defined by multiple different sets of multiple telescopes collectively span all longitudes of the planetary surface, all latitudes of the planetary surface, or even the entire planetary surface. As discussed above, about 30 or more telescopes can in some examples be sufficient to span the entire planetary surface. Note that the inventive telescope array 100 can be advantageously employed even without contiguous coverage of all areas of Earth's surface across which the vehicle carrying the telescope array 100 might travel. In some examples, gaps in that coverage can be spanned, filled, or bridged by dead reckoning, or with received external telemetry (e.g., radar, lidar, beacons, markers, satellite signals, clock signals, and so forth), GPS signals, or INS data, even if only approximate.

In some examples of inventive telescope arrays 100, including any globular array and some examples of directed arrays, each telescope 105 is included in only one of the sets of multiple telescopes. In a specific example of such an arrangement, telescopes 105*a/b/c* of a directed array can be aligned for simultaneous imaging of the summer triangle stars 99*a/b/c*, and the telescopes 105*d/e/f* can be aligned for simultaneous imaging of the winter triangle stars 99*d/e/f* (as in FIGS. 3A/B). In other examples, including some other examples of directed arrays, one or more telescopes 105 can be included in two or more sets of multiple telescopes. In a specific example of such an arrangement (as in FIGS. 4A/B), telescopes 105*a/b/c* of a directed array can be aligned for simultaneous imaging of the summer triangle stars 99*a/b/c*, and the telescopes 105*d/e/c* can be aligned for simultaneous imaging of the winter triangle stars 99*d/e/f*. In this example the telescope 105*c* is included in both sets of telescopes, imaging star 99*c* with the array 100 aligned with the summer triangle, and imaging star 99*f* with the array 100 aligned with the winter triangle stars. In a directed array 100, inclusion of a telescope 105 in multiple sets can reduce the overall number of telescopes 105 required to provide imaging of all sets of predesignated celestial objects, with concomitant reductions in cost, weight, part count, or complexity of the telescope array 100. In the specific examples shown, the arrangement of FIGS. 4A/B achieves with five telescopes 105 the same result as the arrangement of FIGS. 3A/B achieves with six telescopes 105.

In some examples, each predesignated celestial object is included in only one of the sets of multiple predesignated celestial objects. The example including the summer and winter triangle stars fit that description. In some examples, one or more celestial objects 99 can be included in two or more sets of predesignated celestial objects. Such an arrangement can be usefully employed, e.g., to achieve contiguous coverage of a portion of Earth's surface, by the regions corresponding to each set of telescopes 105. To encompass contiguously a designated ground track, for example, a sequence of star sets can be selected that encompass the ground track, with one star of each set belonging also to the next set in the sequence.

The telescopes 105 of the array 100 can be of any suitable type or arrangement (e.g., reflective or refractive), and can operate in any suitable portion of the electromagnetic spectrum (e.g., UV, visible, or infrared). In many examples each telescope typically includes a corresponding objective focusing optical element 106 (e.g., a primary mirror or lens 106); in some of those examples one or more of the telescopes 105 can include one or more corresponding additional reflective or refractive optical elements (e.g., one or more secondary lenses or mirrors). In some examples one or more of the telescopes 105 can include one or more wavelength-dependent or polarization-dependent optical elements (e.g., one or more high-pass, low-pass, or bandpass filters, linear polarizers, and so forth). In some examples optical elements of each telescope 105 are in fixed positions; in other examples one or more optical elements of each telescope can be movable relative to the corresponding telescope 105 to enable telescope adjustment. In some examples one or more of the telescopes 105 can include one or more apertures 107; in some of those examples, the aperture 107 can be movable relative to the corresponding telescope 105, to enable fine adjustment of its effective alignment.

Figure 5B:
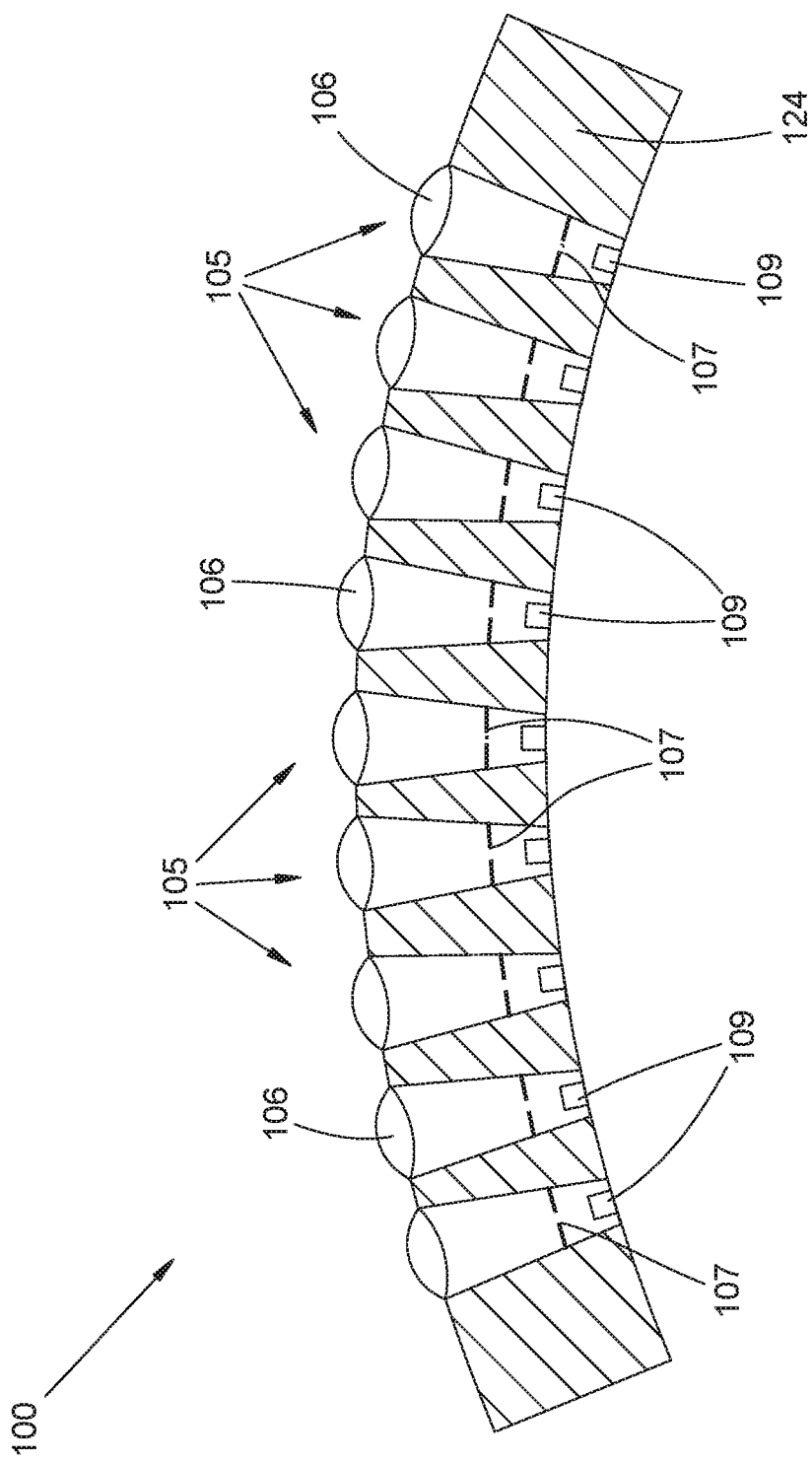
Figure 5C:
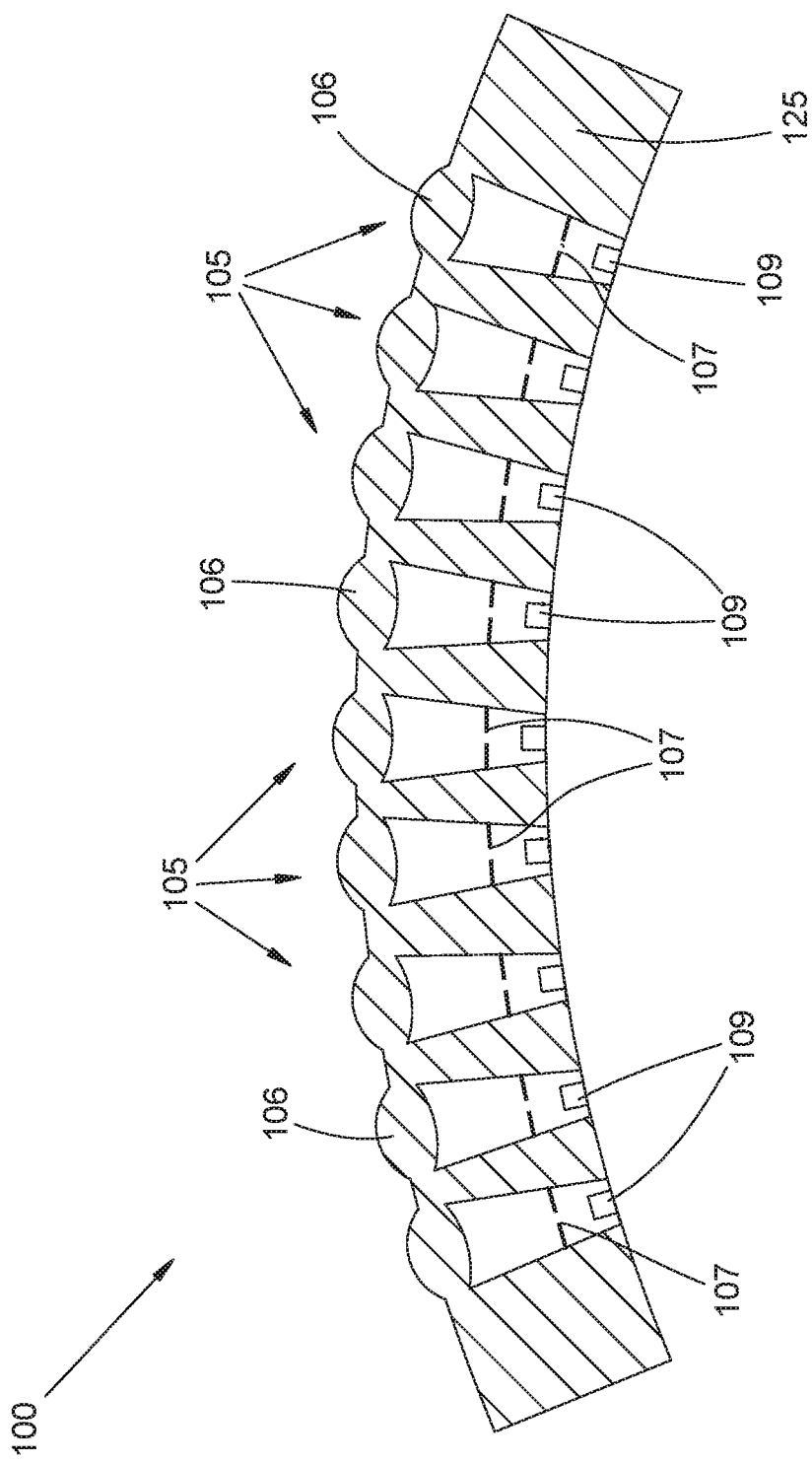

The telescopes 105 of the array 100 can be substantially rigidly connected together in any suitable way. In some examples (as in FIG. 5A), each telescope 105 can constitute a discrete unit or assembly, and multiple discrete telescopes can be rigidly connected together to form the array 100, e.g., by a rigid frame or superstructure 123. Care should be taken to ensure mechanical rigidity and stability as well as suitably low or suitably matched coefficients of thermal expansion (CTEs) among the materials used (e.g., Pyrex® glass for non-optical components of the telescopes 105). Over large temperature swings, mismatched CTEs can result in relative misalignment of one or more telescopes 105 of the array 100. Those concerns can be reduced or eliminated in other examples wherein the multiple telescopes 105 can all be formed in a single monolithic volume of solid material. In some monolithic examples (as in FIG. 5B), multiple bores can be formed in a single, monolithic volume of material 124 at the desired relative angles of the telescopes 105 of the array, and optical components for each telescope can be mounted within each corresponding bore. In some other monolithic examples (as in FIG. 5C), one or more or all optical components of each telescope can be integrally formed in the monolithic volume of material 125; in such examples, the material 125 constitutes a suitable optical material such as an optical glass.

As discussed above, the array 100 of telescopes 105 must rotate relative to the vehicle on which it is carried in order to maintain alignment of at least one set of telescopes 105 with its corresponding set of celestial objects 99 as the vehicle moves. An inventive apparatus can further include a telescope positioning system operatively coupled to the telescope array 100. The telescope positioning system can be structured and arranged so as to provide controlled rotational movement of the telescope array 100, typically about three rotation axes. In some examples the positioning system can include one or more rotary stages, gimbals, or goniometers of any suitable type or arrangement to provide rotation, driven by stepper motors, servo motors, or any other suitable actuators. In many examples, the inventive apparatus can further include a telescope position control system of any suitable type or arrangement (that often can include a computer system including one or more programmed processors and one or more non-transient digital storage media) that provides to the telescope positioning system one or more control signals that result in movement of the telescope array 100 to a selected orientation or scanning of the telescope array 100 across a selected range of orientations.

Use of the inventive telescope array 100 requires that certain telescopes 105 be "aligned" with their corresponding celestial objects 99, meaning that light from the celestial object 99 is received by and passes through the corresponding telescope 105 to form an image to be detected. More accurately, an Airy disc (arising from the telescope's objective aperture, or in some examples by an internal aperture) is formed by the telescope from light received from a star. An inventive apparatus can further include a corresponding photodetector 109 coupled to each telescope 105. Each photodetector 109 can be arranged so as to receive light directed by each corresponding telescope 105 from the corresponding predesignated celestial object 99. The photodetectors 109 can be of any one or more suitable types, including, e.g., single-channel detectors such as photodiodes, avalanche photodiodes, or photomultipliers, or multi-channel photodetector arrays (e.g., CMOS or CCD). In some examples the photodetectors 109 are in fixed positions relative to their corresponding telescopes 105, and that position determines in part the alignment of the telescope 105. In other examples, one or more photodetectors 109 can be movable relative to their corresponding telescopes 105, enabling some adjustment of telescope alignment. The minimum size of the Airy disc formed by each of the telescopes 105, relative to the size of a corresponding aperture 106, a corresponding single-channel photodetector 109, or relative to a pixel size of a corresponding multi-channel photodetector array, limits the angular alignment precision provided by that telescope 105 according to conventional principles of optics. In some examples an aperture 106 can be the element that determines the angular resolution provided by the telescope 105; in other examples the size of a single-channel photodetector 109, or the pixel size of a multi-channel photodetector 109, can determine the angular resolution provided by the telescope 105.

In some examples, each photodetector 109 can be coupled to only one telescope 105; in some examples, each telescope 105 is coupled to only one photodetector 109. In some examples it can be advantageous for multiple telescopes 105 to be coupled to a common photodetector 109 to reduce the overall number of parts and components. Such examples can include, e.g., arrangements in which one single-channel detector 109 is positioned to receive light from two or more telescopes 105 that are aligned in different directions and are included in distinct sets of telescopes 105 (and so would not be in use simultaneously), or arrangements in which one multi-channel detector 109 is positioned to receive light from two or more telescopes 105 on distinct corresponding areas of the detector array 109. In some examples, two or more photodetectors 109 (typically single-channel detectors) can be positioned to receive light from one telescope 105 that has a sufficiently large angular field-of-view to collect and transmit light from two distinct celestial objects 99.

With the inventive telescope array 100 positioned so that the telescopes 105 of one of the sets are aligned with their corresponding stars 99, then the orientation of the telescope array 100 relative to the celestial sphere can be determined, calculated, or estimated. With the telescope array 100 thus oriented with respect to the celestial sphere, the orientation of the telescope array 100 with respect to the vehicle on which it is mounted (obtained in any suitable way, e.g., using rotary or linear encoders, micrometer scales, vernier scales, and so forth that are coupled to the telescope positioning system), or with respect to the nadir (described further below), can be used in combination with date/time and ephemeris data to determine, calculate, or estimate course or position of the vehicle relative to Earth's surface (discussed further below). In some examples ephemeris data can be stored or generated locally in the position control system, so that the apparatus need not rely on external data or signals. Similarly, in some examples the apparatus can include an onboard clock of any suitably accurate type (e.g., electronic, electromechanical, atomic, and so on), so that the apparatus need not rely on external data or signals. Alternatively, in some examples one or both of the date/time or ephemeris data can be obtained from an external source. In addition to being limited by the accuracy of estimates of relative orientation (e.g., nadir relative to the celestial sphere), the accuracy of any estimate of ground position is also limited by accuracy of the date/time, which determines what point on the planetary surface lies at the intersection with the nadir. In some examples, nanosecond temporal accuracy can be required to achieve accuracy of the estimated ground position on the order of tens of feet. Correspondingly lower temporal accuracy resolution would be required for surface accuracy on the order of hundreds of feet, thousands of feet, or more. Temporal accuracy requirements are correspondingly more stringent for larger vehicle velocities.

The alignment of the telescope array 100 relative to the celestial sphere can be achieved or maintained in any suitable way. Typically so-called active alignment is required, in which signals from the corresponding photodetectors 109 are monitored during movement of telescope array 100. A photodetector signal maximized with respect to telescope alignment is an indicator that the corresponding telescope 105 is aligned with its corresponding celestial object 99. In some examples, the telescope position control system is structured, arranged, and connected so as to couple one or more of the photodetectors 109 to the positioning system in a negative feedback arrangement (e.g., coupled by a servomechanism). Signals from one or more photodetectors 109 (i.e., those photodetectors 109 coupled to the telescopes 105 of the set that are selected to be aligned with their corresponding celestial objects 99) are processed by the position control system to produce error signals, which in turn are used to generate control signals transmitted to the telescope positioning system to rotate the telescope array 100. The feedback arrangement maintains the telescopes 105 of the selected set aligned with their corresponding celestial objects. Any suitable feedback mechanism or scheme can be employed. In some feedback examples, small-amplitude dithering motion of the telescope array 100 can be employed to generate the error signals; in some examples small-amplitude dithering of one or more telescope components (e.g., an aperture) can be employed; in some examples small-amplitude dithering of one or more photodetectors can be employed. Such small-amplitude dithering motion is defined as being small enough that some light from the celestial object 99 reaches the corresponding photodetector throughout the dithering motion. As the vehicle moves or the Earth rotates, the feedback arrangement causes the telescope array 100 to track to maintain alignment of the telescopes 105 of the selected set on the corresponding stars 99.

Instead of keeping the telescope array 100 oriented for steady alignment of a set of telescopes 105 on its corresponding stars (as described in the preceding paragraph), the telescope array 100 can instead be repeatedly scanned over a limited range of orientations (e.g., over a fraction of a degree or one or a few degrees; substantially larger than the small-amplitude dithering described above) within which the corresponding stars 99 are expected to be found. During each full scan light from each star 99 of the selected set will transiently reach the corresponding photodetector 109 through the corresponding telescope 105. The orientation of the telescope array 100 (relative to the vehicle or nadir) can be recorded that corresponds to each such transient detection of a star 99. Repeated transient detections can reduce a signal to noise level in any suitable way. The position control system can include a computer system that can calculate an estimated orientation of the vehicle relative to the celestial sphere from the corresponding orientations of the telescope array 100 during the transient detections of light from each star 99 of the set. That estimated orientation can be calculated even though the telescope array 100 might never be oriented during scanning so that light from all of the stars 99 of the set reach the corresponding detectors 109 through the corresponding telescopes 105 simultaneously. The telescope array 100 need only be approximately aligned (within the scanning range) to the selected set of stars 99 with the corresponding set of telescopes 105; transient detections during scanning are sufficient to estimate more accurately the orientation of the telescope array 100. As the vehicle moves, the position control system can alter the scanning range so that the selected stars 99 remain within the scanning range and continue to be detected transiently during each scan.

Figure 3A:
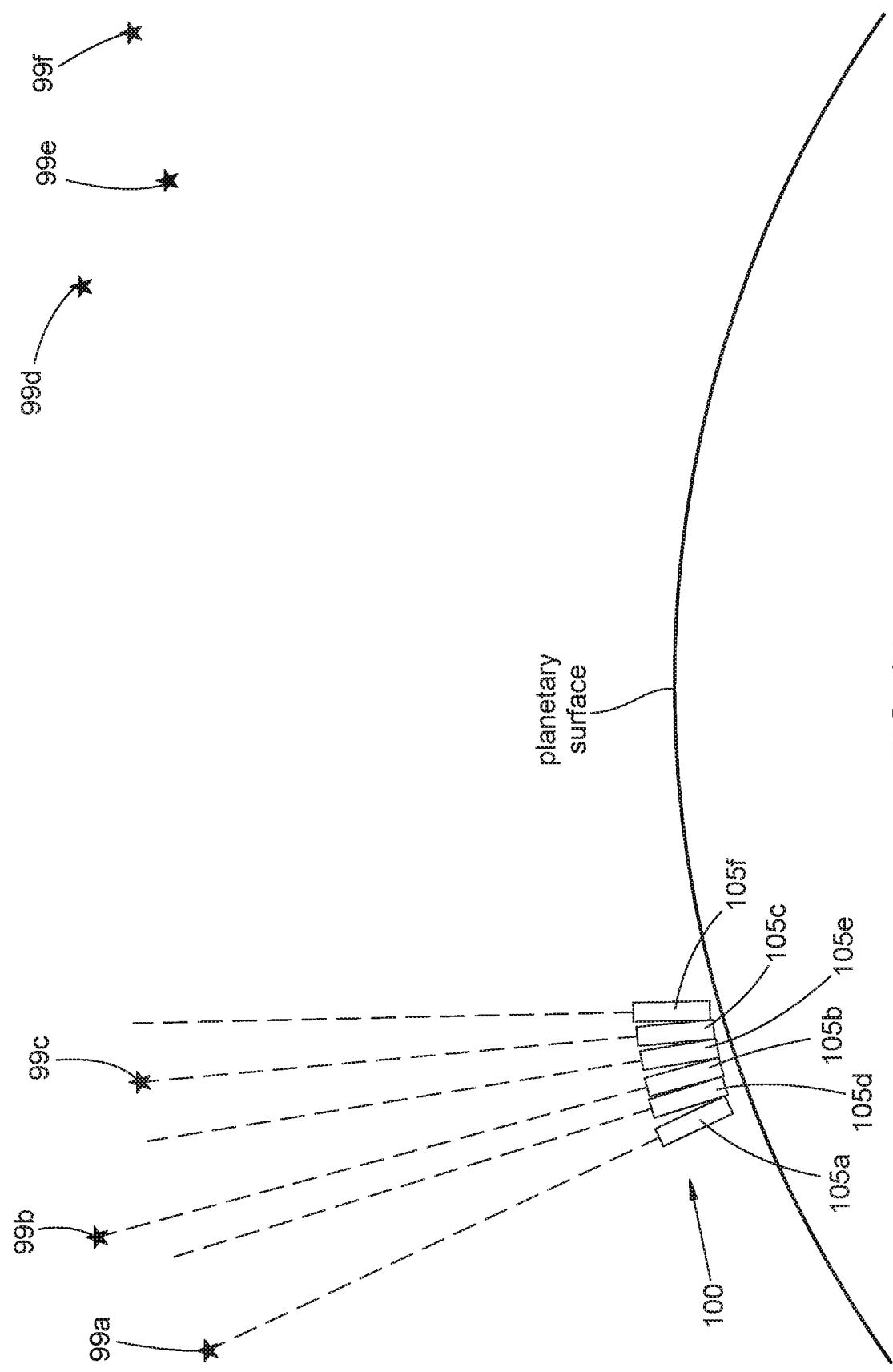
FIGS. 3A and 3B illustrate an inventive telescope array including two sets of telescopes aligned for two corresponding sets of stars; each telescope is in only one set.
Figure 3B:
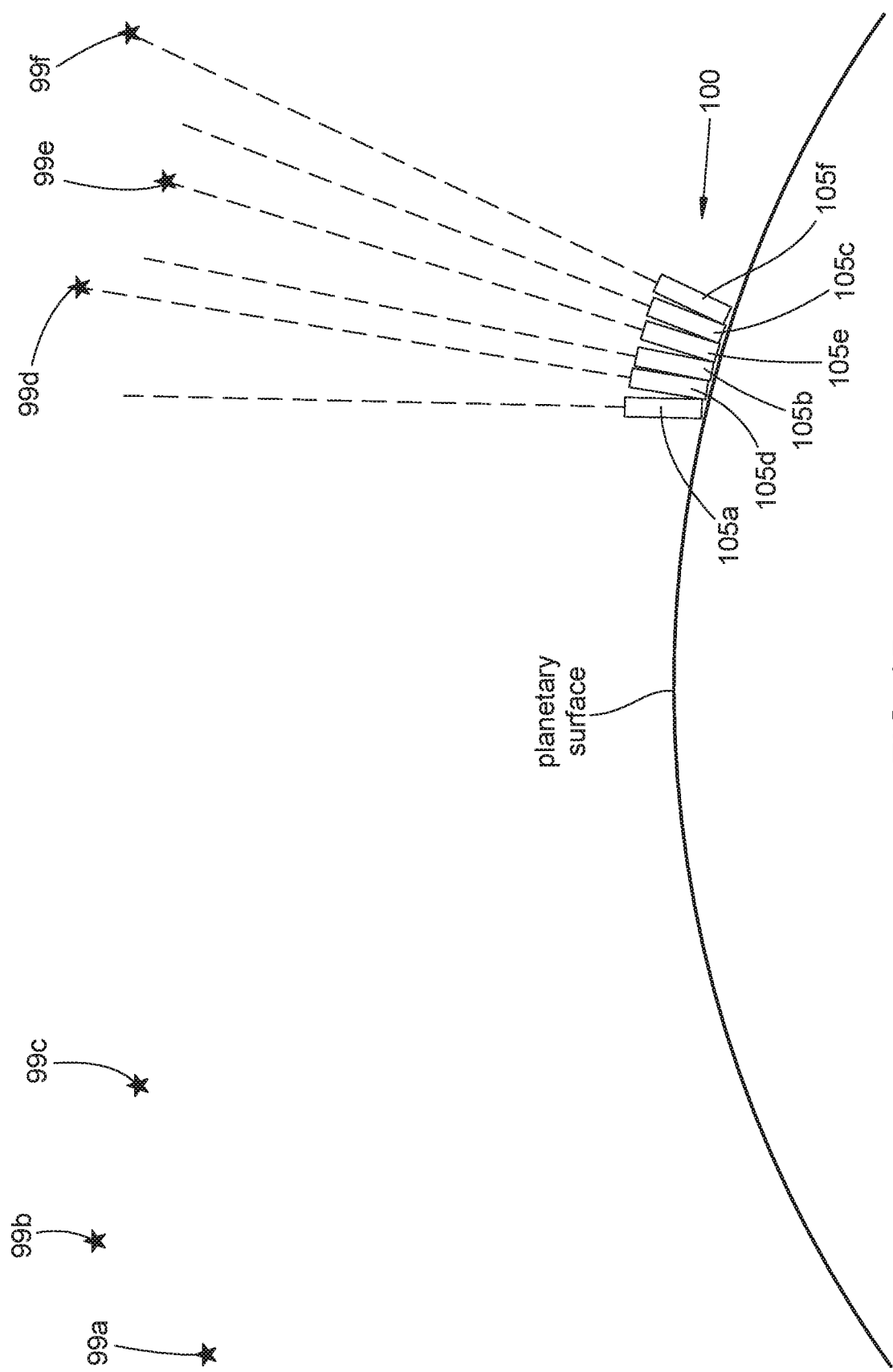
Figure 4B:
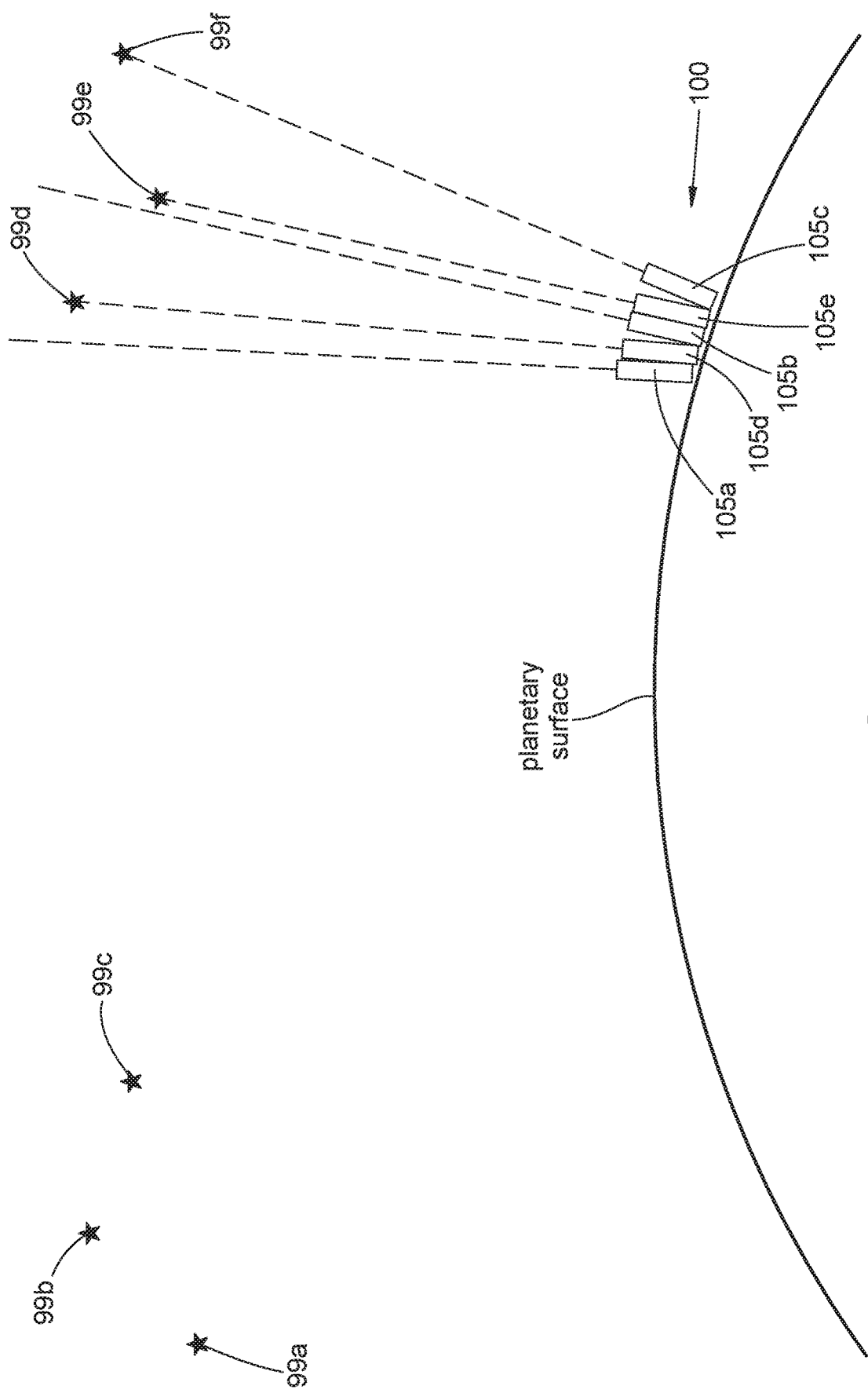

The telescope array 100, telescope positioning system, and telescope position control system can maintain orientation of the telescope array 100 with a selected set of telescopes 105 aligned with a corresponding set of celestial objects 99 (steadily, using feedback; transiently, using scanning), as long as those celestial objects 99 are within a "field-of-view" of that set of telescopes 105 (equivalently, when the telescope array 100 is located within the corresponding defined region of Earth's surface; see discussion above), which can be limited in any of the ways described earlier. As the vehicle moves or Earth rotates, the first selected set of celestial objects 99 may leave the field-of-view (equivalently, the telescope array 100 may leave the corresponding defined region of the planetary surface). To continue operating, a different set of celestial objects 99 can be selected, the telescope array can be oriented with the corresponding set of telescopes 105 aligned to the newly selected set of celestial objects 99, and coupling to the position control system can be switched to the corresponding set of photodetectors 109. That switching can include selectively connecting some photodetectors 109 and disconnecting others, or selectively monitoring and processing signals from some photodetectors 109 while disregarding others. Examples switching from one set of predesignated celestial objects to another is illustrated in FIG. 3A/B and in FIGS. 4A/B. In each of those examples, the telescope array is first aligned with celestial objects 99*a/b/c* (in FIGS. 3A and 4A), and later aligned with celestial objects 99*d/e/f* (in FIGS. 3B and 4B).

Accordingly, the telescope positioning system typically can include a computer system (including one or more programmed processors and one or more non-transient digital storage media) that can select, from among the sets of predesignated celestial objects 99, one of those sets having objects that can be imaged simultaneously from the known or estimated location of the telescope array 100 at the current date/time. To make that selection, in some examples the computer system can receive, estimate, or derive the observation date/time or observation position from one or more of an onboard clock, onboard, generated, or received ephemeris data, a global positioning system, an inertial navigation system, received telemetry, onboard or received planetary surface map data, or planetary surface imagery (acquired using an onboard camera). After selection of a particular set of celestial objects 99, the computer system can generate and transmit to the telescope positioning system control signals that result in movement of the telescope array 100 so that the selected celestial objects 99 are in the field-of-view, and switch coupling to the corresponding set of photodetectors 109. With the telescope array 100 thus oriented, the telescopes 105 of the corresponding set are aligned to enable simultaneous imaging by each telescope 105 of that set (e.g., if a feedback arrangement is employed), or transient reception of light during angular scanning of the telescope array 100 (e.g., if a scanning arrangement is employed), of the corresponding celestial objects 99 of the selected set.

Figure 6:
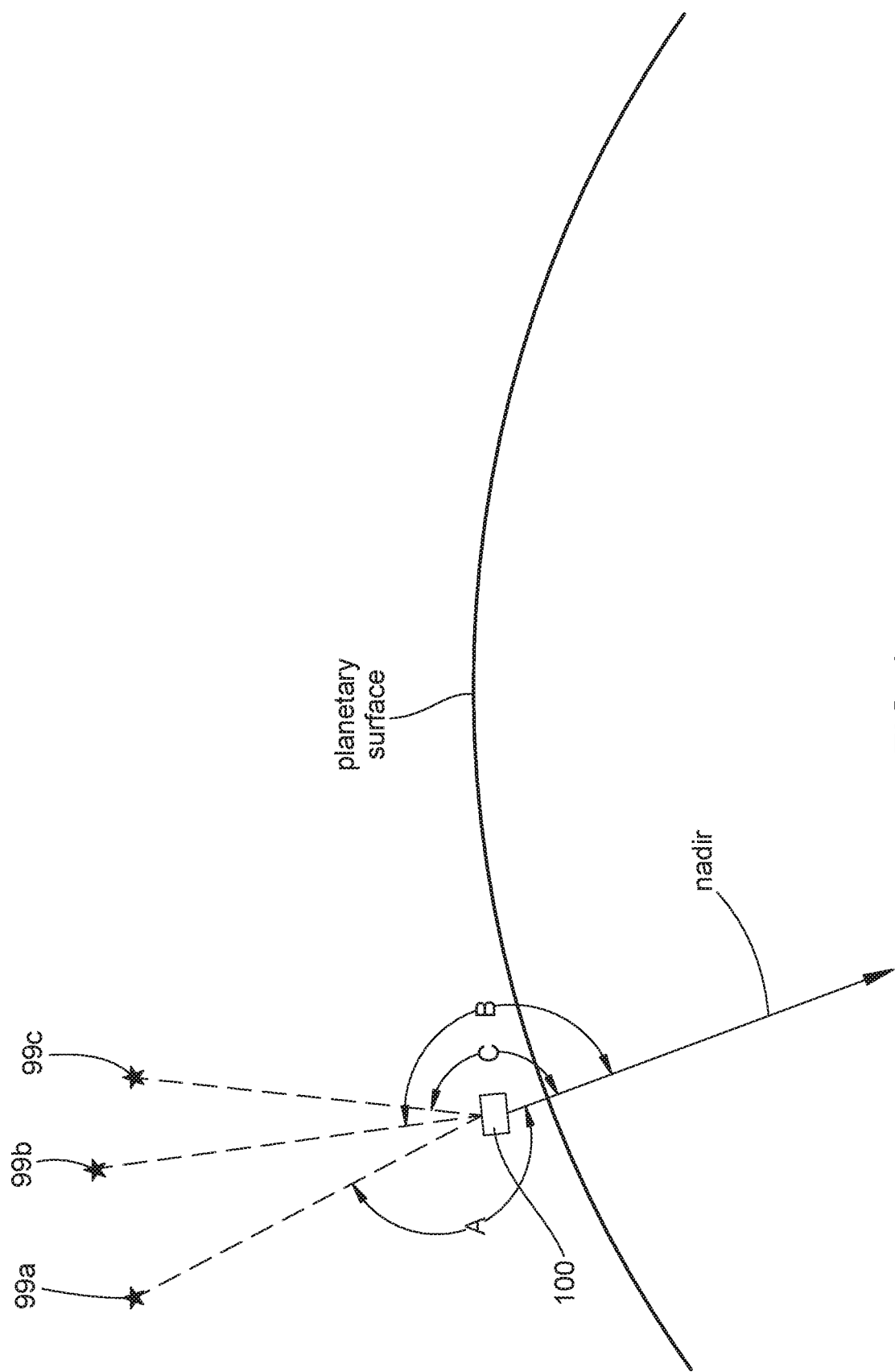
FIG. 6 illustrates schematically the spatial relationships among the celestial sphere, the telescope array orientation, the nadir, and the ground position.

Determining or estimating orientation of the telescope array 100 with respect to the celestial sphere is not sufficient to determine or estimate the position of the telescope array 100 on or near planetary body, e.g., Earth. That orientation can be combined with date/time of observation (e.g., from an onboard clock), ephemeris data (e.g., stored or generated onboard), and nadir direction (relative to the telescope array 100, and therefore relative to the celestial sphere) to determine or estimate two-dimensional position relative to the planetary surface, e.g., Earth's surface. Stored or received surface map data, acquired surface imagery, or both can be employed to correlate the nadir position on the Earth's surface with an estimated position on a surface map or surface image. The two-dimensional position (i.e., the ground position) is the location on the planetary surface of the intersection of the nadir with the planetary surface (as in FIG. 6). Accordingly, an inventive apparatus can include a device for measuring or estimating the nadir relative to the telescope array 100, or equivalently, orientation of the nadir with respect to the vehicle on which the telescope array 100 and the nadir-measuring device are both mounted. With the telescope array 100 aligned with celestial objects 99*a/b/c*, measurement of the nadir enables yields the angles A, B, and C between the directions of the corresponding telescopes 105 imaging the celestial objects 99*a/b/c* and the nadir. Those angles, along with the known angles between the celestial bodies 99*a/b/c*, in turn enable calculation of the location of the zenith (observed from the location of the telescope array 100) relative to the celestial bodies 99*a/b/c*. With that position in hand along with the date/time and ephemeris data, the estimated location of the telescope array 100 on or above the planetary surface can be determined. As the vehicle moves, the nadir traces a ground track on the planetary surface. The ground track can be estimated as the vehicle moves by repeated measurements of the orientation of the telescope array 100 and the nadir combined with corresponding observation dates/times and ephemeris data, in some examples along with surface map data and/or surface imagery. The accuracy and precision of the estimated ground track are limited by accuracy and precision of (i) the observation dates/times, (ii) the estimate of the orientation of the telescope array 100, and (iii) the estimate of the nadir.

Any suitable device can be employed to determine or estimate the nadir, e.g., one or more linear accelerometers or a plumb bob. In some examples (as in FIGS. 7A/B), the nadir-measuring device 200 includes a body 201 with an evacuated volume 299, a probe particle 210, a release mechanism 220, a two-dimensional particle position sensor 230, and a control and acquisition system operatively couped to the release mechanism 220 and the particle position sensor 230. The release mechanism 220 is mounted on the body 201 at a first end of the evacuated volume 299, and the particle position sensor 230 is mounted on the body 201 and positioned at a second end of the evacuated volume 299. The body 201 is oriented with respect to the planetary gravitational field so that the particle position sensor 230 is vertically below the release mechanism 220. In some examples the body 201 includes a chamber enclosing the evacuated volume 299. If used in combination with a telescope array 100 as described above, in some examples both the telescopes 105 and the evacuated volume 299 can be formed in the same monolithic volume of material. The release mechanism 220 is convertible between a hold state and a release state. With the release mechanism 220 in the hold state it holds the probe particle 210 at the first end of the evacuated volume 299; with the release mechanism 220 in the release state, the probe particle 210 is free to move within the evacuated volume 299 in response to the planetary gravitational field, i.e., to fall through the volume 299. The release mechanism 220 can be of any suitable type or arrangement, e.g., an electromagnetic mechanism, an electrostatic mechanism, or a mechanical mechanism (e.g., jaws, slide, latch, clamp, sear, and so on).

The probe particle 210 can be of any suitable type, arrangement, or material. Its transverse dimensions in part limit the accuracy of the nadir measurement and so should be kept as small as practicable (e.g., sub-millimeter). A probe particle 210 formed from a dielectric material can be used with an electrostatic release mechanism, while a probe particle 210 formed from a conductive, magnetic material can be used with an electromagnetic release mechanism. Upon release by the release mechanism 220, the probe particle 210 falls through the evacuated volume 299 under the influence of the planetary gravitational field and lands on or passes through the two-dimensional particle position sensor 230. In the absence of other perturbations, the line of fall of the probe particle 210 follows the nadir. The point where the probe particle 210 passes through or lands on the position sensor 230, and the positions of the release mechanism 220 and position sensor 230 relative to the vehicle, can be used to determine the nadir relative to the vehicle. For repeated measurements, in some examples the probe particle 210 can be retrieved and recycled to the release mechanism 220 for another drop. In some examples, a reservoir of many probe particles 210 can be provided for multiple drops; after each drop the probe particle 210 can be removed from the position sensor 230 (if it landed) but not reused. The two-dimensional particle position sensor 230 can be of any suitable type or arrangement. In some examples the particle position sensor 230 can comprise a two-dimensional photodetector array or imaging array (e.g., such as those used in digital cameras); the position of the probe particle 210 on the position sensor 230 is detected optically. In other examples, the particle position sensor 230 can comprise a two-dimensional capacitive or resistive sensor (e.g., such as those used in touchscreens or touchpads); the position of the probe particle 210 on the position sensor 230 is detected electrically. In some examples the particle position sensor 230 can comprise an array of multiple light sources arranged to define collectively and illuminate a two-dimensional detection surface of the particle position sensor a virtual surface defined by intersecting or overlapping light beams), and (ii) an array of multiple photodetectors arranged about a periphery of the detection surface and illuminated by the light sources. The detected position can be determined based on which one or more detectors of the array registers a transient reduction in illumination intensity. Any suitable two-dimensional position sensor 230 can be employed.

To measure the nadir, the body 201 is first aligned so that the position sensor 230 is vertically below the release mechanism 220, i.e., along an approximate nadir direction. The approximate nadir direction can be obtained in any suitable way. In some examples, one or more linear accelerometers can be employed to detect the approximate direction of the local gravitational field. In some examples, the Earth's horizon can be sighted in several different directions. The set of all such lines-of-sight form a cone, and the axis of that cone is the nadir. Horizon measurements in three or more different directions can enable the approximate nadir to be determined. In some examples, direct surface imaging and/or accurate surface map data can enable an approximate nadir to be determined. In some examples, an estimated planetary nadir can be received or derived from a global positioning system, from an inertial navigation system, or from received telemetry.

However the approximate nadir is determined, the body 201 can be rotated so that the release mechanism and the particle position sensor are aligned along the approximate nadir (using a positioning system operatively coupled to the control and acquisition system). A positioning system of any suitable type or arrangement can be employed, including those described above for orienting the telescope array 100. In some examples wherein the vehicle can be reliably assumed to operate in a specific orientation with respect to the gravitational field (i.e., nearly always "right-side-up"), it may be sufficient to rigidly mount the body 201 on the vehicle in a vertical orientation. As noted above, If used in combination with a telescope array 100 as described above, in some examples both the telescopes 105 and the evacuated volume 299 can be formed in the same monolithic volume of material. However the approximately vertical orientation of the body 201 is achieved, the release mechanism 220 can be switched from the hold state to the release state to release the probe particle 210. The probe particle's point of impact on the particle position sensor 230 is detected and used to calculate a measured orientation of the body 201 relative to a planetary nadir (and equivalently, orientation of the vehicle and the telescope array 100 relative to the nadir).

In some examples, the nadir-measuring device 200 can include a clock arranged for measuring a drop time of the probe particle 210 falling from the release mechanism 220 to the position sensor 230. The strength of a planetary gravitational field varies in a well-characterized way with altitude above the planetary surface. Using the measured time drop time for the falling probe particle 210, the control and acquisition system can calculate an estimated altitude above the planetary surface. The accuracy of that estimate typically can be limited by the precision of the drop time measurement and the magnitude of the variation of gravitational field with altitude for the planetary body. In Earth's gravitational field, altitude above Earth's surface can in some examples be estimated to within about 5000 feet.

Various perturbations can alter the measurement of the nadir described above. Local variations in Earth's gravitational field can alter the nadir measurement; in some examples, known gravitational variations can be accounted for in the calculation of the measured nadir. If the probe particle includes magnetic material, local magnetic fields can alter the nadir measurement; in some examples, known or measured magnetic fields can be accounted for in the calculation of the measured nadir. Vehicle acceleration while the probe particle drops can alter the nadir measurement; in some examples one or more accelerometers can be employed, and their output used to account for acceleration in the calculation of the measured nadir. In some examples, a magnetic probe particle can be employed, and suitably arranged magnetic fields can be applied to compensate for acceleration of the vehicle. Other correction or compensation schemes can be employed.

The systems and methods disclosed herein that include or employ a computer system can be implemented as or with general or special purpose computers or servers or other programmable hardware devices programmed through software, or as hardware or equipment "programmed" through hard wiring, or a combination of the two. A "computer" or "server" can comprise a single machine or can comprise multiple interacting machines (located at a single location or at multiple remote locations). Computer programs or other software code, if used, can be implemented in tangible, non-transient, temporary or permanent storage or replaceable media, such as by including programming in microcode, machine code, network-based or web-based or distributed software modules that operate together, RAM, ROM, CD-ROM, CD-R, CD-R/W, DVD-ROM, DVD±R, DVD±R/W, hard drives, thumb drives, flash memory, optical media, magnetic media, semiconductor media, or any future computer-readable storage alternatives. Electronic indicia of a dataset can be read from, received from, or stored on any of the tangible, non-transitory computer-readable media mentioned herein.

In addition to the preceding, the following example embodiments fall within the scope of the present disclosure or appended claims:

Example 1. An apparatus comprising a telescope array that includes one or more sets of multiple telescopes, the corresponding telescopes of each set being substantially rigidly connected together at a set of predetermined relative orientations with respect to one another and with respect to telescopes of all other sets, so that the corresponding telescopes within each set are oriented relative to one another so as to enable simultaneous imaging, by each telescope of that set, of a corresponding celestial object of a corresponding set of multiple predesignated celestial objects.

Example 2. The apparatus of Example 1 wherein one or more of the sets of multiple telescopes include three or more corresponding telescopes, and one or more of the sets of multiple predesignated celestial objects include three or more corresponding celestial objects.

Example 3. The apparatus of any one of Examples 1 or 2 wherein each telescope is included in only one of the sets of multiple telescopes.

Example 4. The apparatus of any one of Examples 1 or 2 wherein one or more telescopes are included in two or more sets of multiple telescopes.

Example 5. The apparatus of any one of Examples 1 through 4 wherein each predesignated celestial object is included in only one of the sets of multiple predesignated celestial objects.

Example 6. The apparatus of any one of Examples 1 through 4 wherein one or more celestial objects are included in two or more sets of multiple predesignated celestial objects.

Example 7. The apparatus of any one of Examples 1 through 6 wherein the predesignated celestial objects include stars brighter than a selected dimmest stellar magnitude.

Example 8. The apparatus of Example 7 wherein the selected dimmest stellar magnitude is about 2.1.

Example 9. The apparatus of any one of Examples 1 through 8 wherein each set of multiple telescopes defines, during a designated date/time period, a corresponding area of a planetary surface above which that set of multiple telescopes can image simultaneously the corresponding celestial objects of the corresponding set of multiple predesignated celestial objects.

Example 10. The apparatus of Example 9 wherein the telescope array is arranged so that, during a designated date/time period, the corresponding areas of the planetary surface defined by the one or more sets of multiple telescopes collectively encompass at least a portion of a designated ground track across the planetary surface.

Example 11. The apparatus of any one of Examples 9 or 10 wherein the telescope array is arranged so that the corresponding areas of the planetary surface defined by one or more sets of multiple telescopes collectively span all longitudes of the planetary surface.

Example 12. The apparatus of any one of Examples 9 through 11 wherein the telescope array is arranged so that the corresponding areas of the planetary surface defined by one or more sets of multiple telescopes collectively span all latitudes of the planetary surface.

Example 13. The apparatus of any one of Examples 9 through 12 wherein the telescope array is arranged so that the corresponding areas of the planetary surface defined by one or more sets of multiple telescopes collectively span the entire planetary surface.

Example 14. The apparatus of any one of Examples 9 through 13 wherein the planetary surface is Earth's surface.

Example 15. The apparatus of any one of Examples 1 through 14 wherein each telescope includes a corresponding objective focusing optical element.

Example 16. The apparatus of Example 15 wherein one or more of the telescopes include one or more corresponding additional reflective or refractive optical elements.

Example 17. The apparatus of Example 16 wherein one or more of the corresponding additional reflective or refractive optical elements are movable relative to the corresponding telescope.

Example 18. The apparatus of any one of Examples 15 through 17 wherein one or more of the telescopes include one or more corresponding wavelength-dependent or polarization-dependent optical elements.

Example 19. The apparatus of any one of Examples 15 through 18 wherein one or more of the telescopes include one or more corresponding apertures.

Example 20. The apparatus of Example 19 wherein one or more of the corresponding apertures are movable relative to the corresponding telescope.

Example 21. The apparatus of any one of Examples 1 through 20 wherein the one or more sets of multiple telescopes are integrally formed in a monolithic volume of solid material.

Example 22. The apparatus of any one of Examples 1 through 21 further comprising a telescope positioning system operatively coupled to the telescope array and structured and arranged so as to provide controlled rotational movement of the telescope array about multiple rotation axes.

Example 23. The apparatus of Example 22 wherein the telescope positioning system is structured and arranged so as to provide controlled rotational movement of the telescope array about three rotation axes.

Example 24. The apparatus of Example 23 wherein the telescope positioning system includes one or more rotary stages, gimbals, or goniometers.

Example 25. The apparatus of any one of Examples 22 through 24 further comprising a telescope position control system arranged so as to provide to the telescope positioning system one or more control signals that result in movement of the telescope array to a selected orientation or scanning of the telescope array across a selected range of orientations.

Example 26. The apparatus of any one of Examples 1 through 25 further comprising a corresponding photodetector coupled to each telescope and arranged so as to receive light directed by each telescope from the corresponding predesignated celestial object.

Example 27. The apparatus of Example 26 wherein the corresponding photodetectors include one or more photodiodes, avalanche photodiodes, or photo multipliers.

Example 28. The apparatus of any one of Examples 26 or 27 wherein the corresponding photodetectors include one or more photodetector arrays.

Example 29. The apparatus of any one of Examples 26 through 28 wherein each photodetector is coupled to only one telescope.

Example 30. The apparatus of any one of Examples 26 through 29 wherein each telescope is coupled to only one photodetector.

Example 31. The apparatus of any one of Examples 26 through 30 wherein one or more of the photodetectors are movable relative to the corresponding telescopes.

Example 32. The apparatus of any one of Examples 26 through 31 wherein the telescope position control system is structured, arranged, and connected so as to couple one or more of the photodetectors to the positioning system in a feedback arrangement, by generating in response to electronic signals generated by one or more of the photodetectors one or more control signals that cause movement of the telescope positioning system that maintains alignment of the corresponding set of multiple telescopes so that light from the corresponding celestial objects remains directed by the corresponding telescopes onto the corresponding photodetectors.

Example 33. The apparatus of any one of Examples 26 through 32 wherein the telescope position control system is coupled to the telescope positioning system so as to scan the telescope array across a preselected range of angles that results in transient reception, during that angular scanning, on each of one or more corresponding photodetectors light directed, by each corresponding telescope of a selected one of the sets of multiple telescopes, from each corresponding celestial object of the corresponding set of predesignated celestial objects.

Example 34. The apparatus of any one of Examples 26 through 33 wherein the telescope positioning system includes a computer system including one or more programmed processors and one or more non-transient digital storage media, the computer being structured, connected and programmed so as to determine or estimate, based on at least identities of the corresponding predesignated celestial bodies, orientation of the telescope array relative to a celestial sphere.

Example 35. The apparatus of Example 34 wherein the computer system is further structured, connected, and programmed so as (i) to select, based on an observation date/time, and a known or estimated observation position of the telescope array, one of the sets of predesignated celestial objects that can be imaged simultaneously by the corresponding set of telescopes at the observation date/time from the observation position, and (ii) to generate and transmit to the telescope positioning system control signals that result in movement of the telescope array so that the corresponding telescopes of the selected set of multiple telescopes are aligned to enable simultaneous imaging by each telescope of that set, or transient reception of light during angular scanning of the telescope array, of the corresponding celestial objects of the selected set of predesignated celestial objects at the observation date/time from the observation position.

Example 36. The apparatus of Example 35 further comprising an onboard clock for determining the observation date/time.

Example 37. The apparatus of any one of Examples 35 or 36 further comprising one or more of: (i) one or more onboard digital storage media encoding ephemeris data or planetary surface map data, (ii) one or more processors programmed for generating ephemeris data, or (iii) one or more cameras for acquiring planetary surface imagery.

Example 38. The apparatus of any one of Examples 35 through 37 wherein the observation date/time or observation position are received, estimated, or derived from one or more of an onboard clock, onboard, generated, or received ephemeris data, a global positioning system, an inertial navigation system, received telemetry, onboard or received planetary surface map data, or planetary surface imagery.

Example 39. The apparatus of any one of Examples 32 through 38 wherein the telescope position control system is structured, arranged, connected, or programmed so as to enable switching of coupling to the positioning system among different sets of photodetectors that are coupled to corresponding different sets of multiple telescopes.

Example 40. The apparatus of any one of Examples 34 through 39 wherein the computer system is further structured, connected, and programmed so as to compute, based on ephemeris data, date/time of observation, orientation of the telescope array relative to the celestial sphere, and orientation of the telescope array relative to a planetary nadir, the position of the telescope array relative to a corresponding planetary surface.

Example 41. The apparatus of Example 40 wherein the planetary nadir is Earth's nadir and the planetary surface is Earth's surface.

Example 42. The apparatus of any one of Examples 40 or 41 further comprising a device structured and arranged for measuring orientation of the telescope array relative to the planetary nadir.

Example 43. The apparatus of Example 42 wherein the device structured and arranged for measuring orientation of the telescope array relative to the planetary nadir comprises: (a) a body including an evacuated volume; (b) a release mechanism mounted on the body at a first end of the evacuated volume convertible between a hold state and a release state; (c) a probe particle, the probe particle being held at the first end of the chamber with the release mechanism in the hold state and being free to move within the evacuated volume in response to a gravitational field with the release mechanism in the release state; (d) a two-dimensional particle position sensor mounted on the body and positioned at a second end of the evacuated volume; and (e) a control and acquisition system, operatively coupled to the release mechanism and the particle position sensor, that is structured and connected so as to (i) switch the release mechanism from the hold state to the release state, (ii) detect a two-dimensional position relative to the particle position sensor where the moving probe particle passes through or lands on the particle position sensor, and (iii) calculate, based on the detected position, a measured orientation of the body relative to a planetary nadir.

Example 44. The apparatus of Example 43 wherein the one or more sets of multiple telescopes are integrally formed in a monolithic volume of solid material and the evacuated volume is formed within the monolithic volume of solid material.

Example 45. An apparatus comprising: (a) a body including an evacuated volume; (b) a release mechanism mounted on the body at a first end of the evacuated volume convertible between a hold state and a release state; (c) a probe particle, the probe particle being held at the first end of the chamber with the release mechanism in the hold state and being free to move within the evacuated volume in response to a gravitational field with the release mechanism in the release state; (d) a two-dimensional particle position sensor mounted on the body and positioned at a second end of the evacuated volume; and (e) a control and acquisition system, operatively coupled to the release mechanism and the particle position sensor, that is structured and connected so as to (i) switch the release mechanism from the hold state to the release state, (ii) detect a two-dimensional position relative to the particle position sensor where the moving probe particle passes through or lands on the particle position sensor, and (iii) calculate, based on the detected position, a measured orientation of the body relative to a planetary nadir.

Example 46. The apparatus of Example 45 wherein the planetary nadir is Earth's nadir.

Example 47. The apparatus of any one of Examples 43 through 46 wherein the body includes a chamber enclosing the evacuated volume.

Example 48. The apparatus of any one of Examples 43 through 47 wherein the two-dimensional particle position sensor comprises a two-dimensional photodetector array or imaging array.

Example 49. The apparatus of any one of Examples 43 through 48 wherein the two-dimensional particle position sensor comprises a two-dimensional capacitive or resistive sensor.

Example 50. The apparatus of any one of Examples 43 through 49 wherein the two-dimensional particle position sensor comprises (i) an array of multiple light sources arranged to define collectively and illuminate a two-dimensional detection surface of the particle position sensor, and (ii) an array of multiple photodetectors arranged about a periphery of the detection surface and illuminated by the light sources.

Example 51. The apparatus of any one of Examples 43 through 50 further comprising one or more accelerometers, wherein the computer system is further structured, connected, and programmed so as to compute, based on signals received from the one or more accelerometers, a correction of the calculation of the orientation of the body with respect to the planetary nadir.

Example 52. The apparatus of any one of Examples 43 through 51 further comprising one or more accelerometers and one or more magnets positioned about the evacuated volume, wherein the probe particle includes magnetic material, and wherein the computer system is further structured, connected, and programmed so as to (i) compute, based on signals received from the one or more accelerometers, a magnetic field profile that alters a trajectory of the probe particle to compensate for acceleration of the body, and (ii) apply corresponding control signals to the one or more magnets to produce the computed magnetic field profile.

Example 53. The apparatus of any one of Examples 43 through 52 wherein the control and acquisition system is further structured and connected so as to rotate the body, or maintain orientation of the body, so that the release mechanism and the particle position sensor are aligned along an estimated planetary nadir.

Example 54. The apparatus of Example 53 wherein the control and acquisition system is further structured and connected so as to determine an estimated planetary nadir, the estimated planetary nadir being received or derived from a global positioning system, from one or more accelerometers, from an inertial navigation system, from received telemetry, or from surface imagery.

Example 55. The apparatus of any one of Examples 53 or 54 further comprising one or more horizon optical sensors arranged so as to image portions of a planetary horizon, wherein the control and acquisition system is further structured and connected to determine the estimated planetary nadir based on measurement of portions of the planetary horizon imaged by the horizon optical sensors.

Example 56. The apparatus of any one of Examples 43 through 55 further comprising a clock arranged for measuring a drop time of a particle falling from the release mechanism to the position sensor, wherein the control and acquisition system is further structured and connected so as to determine an estimated altitude above a planetary surface.

Example 57. A method employing the apparatus of any one of Examples 34 through 44, the method comprising: (A) using the computer system, based on one or more of an estimated observation position, an observation date/time, or ephemeris data, selecting one of the sets of multiple pre-designated celestial objects that can be imaged simultaneously by the corresponding set of multiple telescopes from the estimated observation position at the observation date/time; (B) using the telescope positioning system, moving the telescopes so that the corresponding telescopes of the corresponding set are steadily or transiently aligned to receive light from the corresponding celestial objects of the selected set; and (C) using the computer system, determining or estimating, based on identity of the corresponding celestial bodies of the selected set, orientation of the telescope array relative to a celestial sphere.

Example 58. A method employing the apparatus of any one of Examples 40 through 44, the method comprising: (A) using the computer system, based on one or more of an estimated observation position, an observation date/time, or ephemeris data, selecting one of the sets of multiple pre-designated celestial objects that can be imaged simultaneously by the corresponding set of multiple telescopes from the estimated observation position at the observation date/time; (B) using the telescope positioning system, moving the telescope array so that the corresponding telescopes of the corresponding set are steadily or transiently aligned to receive light from the corresponding celestial objects of the selected set; (C) using the computer system, determining or estimating, based on identity of the corresponding celestial bodies of the selected set, orientation of the telescope array relative to a celestial sphere; (D) using the device structured and arranged therefor, measuring orientation of the telescope array relative to the planetary nadir; and (E) computing, based on the orientation of the telescope array determined or estimated relative to the celestial sphere, a measured orientation of the telescope array relative to the planetary nadir, the observation date/time, or ephemeris data, an estimated position on the planetary surface intersected by the planetary nadir.

Example 59. The method of Example 58 further comprising repeating steps (A) through (E) to determine or estimate a ground track across the planetary surface.

Example 60. The method of any one of Examples 58 or 59 further comprising, using the position on the planetary surface computed in part (E), applying a correction to an inertial navigation system.

Example 61. The method of any one of Examples 58 through 60 wherein the planetary surface is Earth's surface and the planetary nadir is Earth's nadir.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Therefore, the present disclosure shall be construed as implicitly disclosing any embodiment having any suitable subset of one or more features—which features are shown, described, or claimed in the present application—including those subsets that may not be explicitly disclosed herein. A "suitable" subset of features includes only features that are neither incompatible nor mutually exclusive with respect to any other feature of that subset. Accordingly, the appended claims are hereby incorporated in their entirety into the Detailed Description, with each claim standing on its own as a separate disclosed embodiment. In addition, each of the appended dependent claims shall be interpreted, only for purposes of disclosure by said incorporation of the claims into the Detailed Description, as if written in multiple dependent form and dependent upon all preceding claims with which it is not inconsistent. It should be further noted that the cumulative scope of the appended claims can, but does not necessarily, encompass the whole of the subject matter disclosed in the present application.

The following interpretations shall apply for purposes of the present disclosure and appended claims. The words "comprising," "including," "having," and variants thereof, wherever they appear, shall be construed as open ended terminology, with the same meaning as if a phrase such as "at least" were appended after each instance thereof, unless explicitly stated otherwise. The article "a" shall be interpreted as "one or more" unless "only one," "a single," or other similar limitation is stated explicitly or is implicit in the particular context; similarly, the article "the" shall be interpreted as "one or more of the" unless "only one of the," "a single one of the," or other similar limitation is stated explicitly or is implicit in the particular context. The conjunction "or" is to be construed inclusively unless: (i) it is explicitly stated otherwise, e.g., by use of "either . . . or," "only one of," or similar language; or (ii) two or more of the listed alternatives are understood or disclosed (implicitly or explicitly) to be incompatible or mutually exclusive within the particular context. In that latter case, "or" would be understood to encompass only those combinations involving non-mutually-exclusive alternatives. In one example, each of "a dog or a cat," "one or more of a dog or a cat," and "one or more dogs or cats" would be interpreted as one or more dogs without any cats, or one or more cats without any dogs, or one or more of each. In another example, each of "a dog, a cat, or a mouse," "one or more of a dog, a cat, or a mouse," and "one or more dogs, cats, or mice" would be interpreted as (i) one or more dogs without any cats or mice, (ii) one or more cats without and dogs or mice, (iii) one or more mice without any dogs or cats, (iv) one or more dogs and one or more cats without any mice, (v) one or more dogs and one or more mice without any cats, (vi) one or more cats and one or more mice without any dogs, or (vii) one or more dogs, one or more cats, and one or more mice. In another example, each of "two or more of a dog, a cat, or a mouse" or "two or more dogs, cats, or mice" would be interpreted as (i) one or more dogs and one or more cats without any mice, (ii) one or more dogs and one or more mice without any cats, (iii) one or more cats and one or more mice without and dogs, or (iv) one or more dogs, one or more cats, and one or more mice; "three or more," "four or more," and so on would be analogously interpreted.

For purposes of the present disclosure or appended claims, when terms are employed such as "about equal to," "substantially equal to," "greater than about," "less than about," and so forth, in relation to a numerical quantity, standard conventions pertaining to measurement precision and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

For purposes of the present disclosure and appended claims, any labelling of elements, steps, limitations, or other portions of an embodiment, example, or claim (e.g., first, second, third, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited in the embodiment, example, or claim or, in some instances, it will be implicit or inherent based on the specific content of the embodiment, example, or claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. An apparatus comprising a telescope array that includes one or more sets of multiple telescopes, the corresponding telescopes of each set being substantially rigidly connected together at a set of predetermined relative orientations with respect to one another and with respect to telescopes of all other sets, so that the corresponding telescopes within each set are oriented relative to one another so as to enable simultaneous imaging, by each telescope of that set, of a corresponding celestial object of a corresponding set of multiple predesignated celestial objects, the corresponding celestial object imaged simultaneously by each telescope of a set differing from the corresponding celestial object imaged simultaneously at least one other telescope of that set.

2. The apparatus of claim 1 wherein one or more of the sets of multiple telescopes include three or more corresponding telescopes that are arranged so as to enable simultaneous imaging by each of three telescopes of that set of a corresponding different one of three or more celestial objects among the corresponding set of multiple predesignated celestial objects.

3. The apparatus of claim 1 wherein the predesignated celestial objects include stars brighter than a selected dimmest stellar magnitude.

4. The apparatus of claim 1 wherein each set of multiple telescopes defines, during a designated date/time period, a corresponding area of a planetary surface above which that set of multiple telescopes can image simultaneously the corresponding celestial objects of the corresponding set of multiple predesignated celestial objects.

5. The apparatus of claim 4 wherein the telescope array is arranged so that, during a designated date/time period, the corresponding areas of the planetary surface defined by the one or more sets of multiple telescopes collectively encompass at least a portion of a designated ground track across the planetary surface, all longitudes of the planetary surface, all latitudes of the planetary surface, or the entire planetary surface.

6. The apparatus of claim 1 wherein each telescope includes a corresponding objective focusing optical element.

7. The apparatus of claim 6 wherein one or more of the telescopes include one or more corresponding additional reflective or refractive optical elements, one or more wavelength-dependent or polarization-dependent optical elements, or one or more apertures.

8. The apparatus of claim 7 wherein one or more of the corresponding additional reflective or refractive optical elements, wavelength-dependent or polarization-dependent optical elements, or apertures are movable relative to the corresponding telescope.

9. The apparatus of claim 1 wherein the one or more sets of multiple telescopes are integrally formed together in a monolithic volume of solid material.

10. The apparatus of claim 1 further comprising a telescope positioning system operatively coupled to the telescope array and structured and arranged so as to provide controlled rotational movement of the telescope array about multiple rotation axes, and a telescope position control system arranged so as to provide to the telescope positioning system one or more control signals that result in movement of the telescope array to a selected orientation or scanning of the telescope array across a selected range of orientations.

11. The apparatus of claim 10 further comprising a corresponding photodetector coupled to each telescope and arranged so as to receive light directed by each telescope from the corresponding celestial object of the corresponding set of predesignated celestial objects.

12. The apparatus of claim 11 wherein the telescope position control system is structured, arranged, and connected so as to couple one or more of the photodetectors to the positioning system in a feedback arrangement, by generating in response to electronic signals generated by one or more of the photodetectors one or more control signals that cause movement of the telescope positioning system that maintains alignment of the corresponding set of multiple telescopes so that light from the corresponding celestial objects remains directed by the corresponding telescopes onto the corresponding photodetectors.

13. The apparatus of claim 11 wherein the telescope position control system is coupled to the telescope positioning system so as to scan the telescope array across a preselected range of angles that results in transient reception, during that angular scanning, on each of one or more corresponding photodetectors light directed, by each corresponding telescope of a selected one of the sets of multiple telescopes, from each corresponding celestial object of the corresponding set of predesignated celestial objects.

14. The apparatus of claim 11 wherein the telescope positioning system includes a computer system including one or more programmed processors and one or more non-transient digital storage media, the computer being structured, connected, and programmed so as to determine or estimate, based on at least identities of the corresponding predesignated celestial bodies, orientation of the telescope array relative to a celestial sphere.

15. A method employing the apparatus of claim 14, the method comprising:
(A) using the computer system, based on one or more of an estimated observation position, an observation date/time, or ephemeris data, selecting one of the sets of multiple predesignated celestial objects that can be imaged simultaneously by the corresponding set of multiple telescopes from the estimated observation position at the observation date/time;
(B) using the telescope positioning system, moving the telescopes so that the corresponding telescopes of the corresponding set are steadily or transiently aligned to receive light from the corresponding celestial objects of the selected set; and
(C) using the computer system, determining or estimating, based on identity of the corresponding celestial bodies of the selected set, orientation of the telescope array relative to a celestial sphere.

16. The apparatus of claim 14 wherein the computer system is further structured, connected, and programmed so as (i) to select, based on an observation date/time, and a known or estimated observation position of the telescope array, one of the sets of predesignated celestial objects that can be imaged simultaneously by the corresponding set of telescopes at the observation date/time from the observation position, and (ii) to generate and transmit to the telescope positioning system control signals that result in movement of the telescope array so that the corresponding telescopes of the selected set of multiple telescopes are aligned to enable simultaneous imaging by each telescope of that set, or transient reception of light during angular scanning of telescope array, of the corresponding celestial objects of the selected set of predesignated celestial objects at the observation date/time from the observation position.

17. The apparatus of claim 14 further comprising an onboard clock for determining the observation date/time.

18. The apparatus of claim 14 wherein the computer system is further structured, connected, and programmed so as to compute, based on ephemeris data, date/time of observation, orientation of the telescope array relative to the celestial sphere, and orientation of the telescope array relative to a planetary nadir, the position of the telescope array relative to a corresponding planetary surface.

19. The apparatus of claim 18 further comprising a device structured and arranged for measuring orientation of the telescope array relative to the planetary nadir.

20. A method employing the apparatus of claim 19, the method comprising:
(A) using the computer system, based on one or more of an estimated observation position, an observation date/time, or ephemeris data, selecting one of the sets of multiple predesignated celestial objects that can be imaged simultaneously by the corresponding set of multiple telescopes from the estimated observation position at the observation date/time;
(B) using the telescope positioning system, moving the telescope array so that the corresponding telescopes of the corresponding set are steadily or transiently aligned to receive light from the corresponding celestial objects of the selected set;
(C) using the computer system, determining or estimating, based on identity of the corresponding celestial bodies of the selected set, orientation of the telescope array relative to a celestial sphere;
(D) using the device structured and arranged therefor, measuring orientation of the telescope array relative to the planetary nadir; and
(E) computing, based on the orientation of the telescope array determined or estimated relative to the celestial sphere, a measured orientation of the telescope array relative to the planetary nadir, the observation date/time, or ephemeris data, an estimated position on the planetary surface intersected by the planetary nadir.

21. The method of claim 20 further comprising repeating steps (A) through (E) to determine or estimate a ground track across the planetary surface.

22. The apparatus of claim 19, wherein the device comprises:
- (a) a body including an evacuated volume;
- (b) a release mechanism mounted on the body at a first end of the evacuated volume convertible between a hold state and a release state;
- (c) a probe particle, the probe particle being held at the first end of the chamber with the release mechanism in the hold state and being free to move within the evacuated volume in response to a gravitational field with the release mechanism in the release state;
- (d) a two-dimensional particle position sensor mounted on the body and positioned at a second end of the evacuated volume; and
- (e) a control and acquisition system, operatively coupled to the release mechanism and the particle position sensor, that is structured and connected so as to (i) switch the release mechanism from the hold state to the release state, (ii) detect a two-dimensional position relative to the particle position sensor where the moving probe particle passes through or lands on the particle position sensor, and (iii) calculate, based on the detected position, a measured orientation of the body relative to a planetary nadir.

23. The apparatus of claim 22 wherein the two-dimensional particle position sensor comprises (i) a two-dimensional photodetector array or imaging array, (ii) a two-dimensional capacitive or resistive sensor, or (iii) a combination of an array of multiple light sources and an array of multiple photodetectors, the multiple light sources being arranged to define collectively and illuminate a two-dimensional detection surface of the particle position sensor, and the multiple photodetectors being arranged about a periphery of the detection surface and illuminated by the light sources.

24. The apparatus of claim 22 wherein the control and acquisition system is further structured and connected so as to rotate the body, or maintain orientation of the body, so that the release mechanism and the particle position sensor are aligned along an estimated planetary nadir.

25. The apparatus of claim 24 wherein the control and acquisition system is further structured and connected so as to determine an estimated planetary nadir, the estimated planetary nadir being received or derived from a global positioning system, from one or more accelerometers, from an inertial navigation system, from received telemetry, or from surface imagery.

26. The apparatus of claim 24 further comprising one or more horizon optical sensors arranged so as to image portions of a planetary horizon, wherein the control and acquisition system is further structured and connected to determine the estimated planetary nadir based on measurement of portions of the planetary horizon imaged by the horizon optical sensors.

27. The apparatus of claim 22 further comprising a clock arranged for measuring a drop time of a particle falling from the release mechanism to the position sensor, wherein the control and acquisition system is further structured and connected so as to determine an estimated altitude above a planetary surface.

* * * * *